(12) United States Patent
Lee et al.

(10) Patent No.: US 12,579,398 B2
(45) Date of Patent: Mar. 17, 2026

(54) FINGERPRINT SENSOR PACKAGE AND SMART CARD INCLUDING THE SAME

(71) Applicant: Samsung Electronics Co., Ltd., Suwon-si (KR)

(72) Inventors: Gwangjin Lee, Bucheon-si (KR); Jaehyun Lim, Hwaseong-si (KR); Hyunjong Moon, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 758 days.

(21) Appl. No.: 17/863,688

(22) Filed: Jul. 13, 2022

(65) Prior Publication Data

US 2023/0177300 A1    Jun. 8, 2023

(30) Foreign Application Priority Data

Dec. 8, 2021    (KR) ......................... 10-2021-0175209

(51) Int. Cl.
G06K 19/07        (2006.01)
G06V 40/13        (2022.01)

(52) U.S. Cl.
CPC ......... G06K 19/0718 (2013.01); G06V 40/13 (2022.01)

(58) Field of Classification Search
CPC .............. G06K 19/0718; G06V 40/13; G06V 40/1306; G06V 40/1329; G06V 40/1318; G06F 18/00; H01L 23/5388; H01L 23/3121; H01L 23/5386; H01L 24/09; H01L 24/48; H01L 25/04;
(Continued)

(56) References Cited

U.S. PATENT DOCUMENTS

| | | | |
|---|---|---|---|
| 5,436,571 | A | 7/1995 | Karasawa |
| 6,784,020 | B2 | 8/2004 | Lee et al. |
| 8,120,024 | B2 | 2/2012 | Song et al. |

(Continued)

FOREIGN PATENT DOCUMENTS

| | | |
|---|---|---|
| KR | 10-2163694 B1 | 10/2020 |
| KR | 102195672 B1 | 12/2020 |

(Continued)

OTHER PUBLICATIONS

First Office Action issued Nov. 11, 2025 in Korean Application No. 10-2021-0175209.

*Primary Examiner* — Abhishek Sarma
(74) *Attorney, Agent, or Firm* — Harness, Dickey & Pierce, P.L.C.

(57)        ABSTRACT

Provided is a fingerprint sensor package including a first substrate including first bonding pads and an external connection pad, a second substrate attached to the first substrate, the second substrate including a plurality of first sensing patterns spaced apart from each other in a first direction and extending in a second direction intersecting the first direction, a plurality of second sensing patterns spaced apart from each other in the second direction and extending in the first direction, second bonding pads, and test pads, conductive wires electrically connecting the first bonding pads and the second bonding pads, a controller chip connected to the second substrate, and a molding layer covering the controller chip and the second substrate and in contact with the first bonding pads, the second bonding pads, the test pads, and the conductive wires.

20 Claims, 21 Drawing Sheets

(58) Field of Classification Search
CPC . H01L 2224/09515; H01L 2224/48091; H01L
2224/48108
See application file for complete search history.

(56) References Cited

U.S. PATENT DOCUMENTS

| 10,762,319 | B2 | | 9/2020 | Tai et al. | |
|---|---|---|---|---|---|
| 2020/0034594 | A1 | * | 1/2020 | Julian | G06V 40/1306 |
| 2021/0074622 | A1 | | 3/2021 | Koo et al. | |

FOREIGN PATENT DOCUMENTS

| KR | 10-2021-0030773 | A | 3/2021 |
|---|---|---|---|
| KR | 10-2021-0068726 | A | 6/2021 |

* cited by examiner

FINGERPRINT SENSOR PACKAGE AND SMART CARD INCLUDING THE SAME

CROSS-REFERENCE TO RELATED APPLICATION

This application is based on and claims priority under 35 U.S.C. § 119 to Korean Patent Application No. 10-2021-0175209, filed on Dec. 8, 2021, in the Korean Intellectual Property Office, the disclosure of which is incorporated by reference herein in its entirety.

BACKGROUND

The inventive concepts relate to a fingerprint sensor package and a smart card including the same.

Fingerprint recognition technology is used to prevent various security incidents by recognizing a user's fingerprint to go through registration and authentication procedures. This technology may be applied to, e.g., network defense of individuals and organizations, protection of various contents and data, and/or secure access to financial information. The fingerprint sensor acquires user's fingerprint information using an optical method, a capacitive method, an ultrasonic method, a thermal sensing method, and/or the like. The recent trend in the fingerprint sensor industry is to achieve low cost while continuously reducing the size and thickness of the product. Accordingly, it is beneficial for the fingerprint sensor package to satisfy economic feasibility and maintain the reliability and sensitivity of the acquisition of fingerprint information and reducing the overall size and height.

SUMMARY

The inventive concepts provide a fingerprint sensor package with improved reliability and a smart card including the same so as to prevent a financial accident due to theft or loss of the smart card.

According to an aspect of the inventive concept, there is provided a fingerprint sensor package including a first substrate including first bonding pads and at least one external connection pad, a second substrate attached to the first substrate, the second substrate including a plurality of first sensing patterns spaced apart from each other in a first direction and extending in a second direction intersecting the first direction, a plurality of second sensing patterns spaced apart from each other in the second direction and extending in the first direction, second bonding pads, and test pads, conductive wires electrically connecting the first bonding pads and the second bonding pads, a controller chip connected to the second substrate, and a molding layer covering the controller chip, the first bonding pads, the second bonding pads, the test pads, and the conductive wires.

According to another aspect of the inventive concepts, there is provided a fingerprint sensor package including: a first substrate including a core insulating layer comprising a first surface and a second surface opposite to each other, a coating layer on the first surface of the core insulating layer, a ground bezel extending along a circumference of the coating layer on the first surface of the core insulating layer, an adhesive layer between the coating layer and the core insulating layer and between the core insulating layer and the ground bezel, first bonding pads on the second surface of the core insulating layer, and at least one external connection pad between an edge of the second surface of the core insulating layer and the first bonding pads; a second substrate attached to the second surface of the core insulating layer, the second substrate including a plurality of first sensing patterns spaced apart from each other in a first direction and extending in a second direction intersecting the first direction, a plurality of second sensing patterns spaced apart from each other in the second direction and extending in the first direction, second bonding pads, and test pads; conductive wires electrically connecting the first bonding pads and the second bonding pads; a controller chip connected to the second substrate; and a molding layer covering the second substrate and the controller chip and extending laterally along the second surface of the core insulating layer from a side surface of the second substrate to a boundary between the first bonding pads and the at least one external connection pad, such that the molding layer covers the first bonding pads, the second bonding pads, the test pads, and the conductive wires, wherein the plurality of first sensing patterns and the plurality of second sensing patterns are spaced apart from each other in a third direction perpendicular to the first and second directions, and the plurality of first sensing patterns and the plurality of second sensing patterns constitute a plurality of capacitors.

According to another aspect of the inventive concept, there is provided a smart card including: a card main body including a groove and a connection pad; a security chip in the card main body; and a fingerprint sensor package in the groove, the fingerprint sensor package configured to sense a user's fingerprint and to transmit a result of the sensing to the security chip, the fingerprint sensor package comprising a first substrate including a core insulating layer including a first surface and a second surface opposite to each other, first bonding pads on the second surface of the core insulating layer, and at least one external connection pad bonded to the connection pad of the card main body, a second substrate attached to the second surface of the core insulating layer, the second substrate including a plurality of first sensing patterns spaced apart from each other in a first direction and extending in a second direction intersecting the first direction, a plurality of second sensing patterns spaced apart from each other in the second direction and extending in the first direction, second bonding pads, and test pads, conductive wires electrically connecting the first bonding pads and the second bonding pads, a controller chip connected to the second substrate, the controller chip configured to receive power potential from at least one of the second bonding pads and a test signal from at least one of the test pads, and a molding layer covering the controller chip, the first bonding pads, the second bonding pads, the test pads, and the conductive wires.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Figure 1:
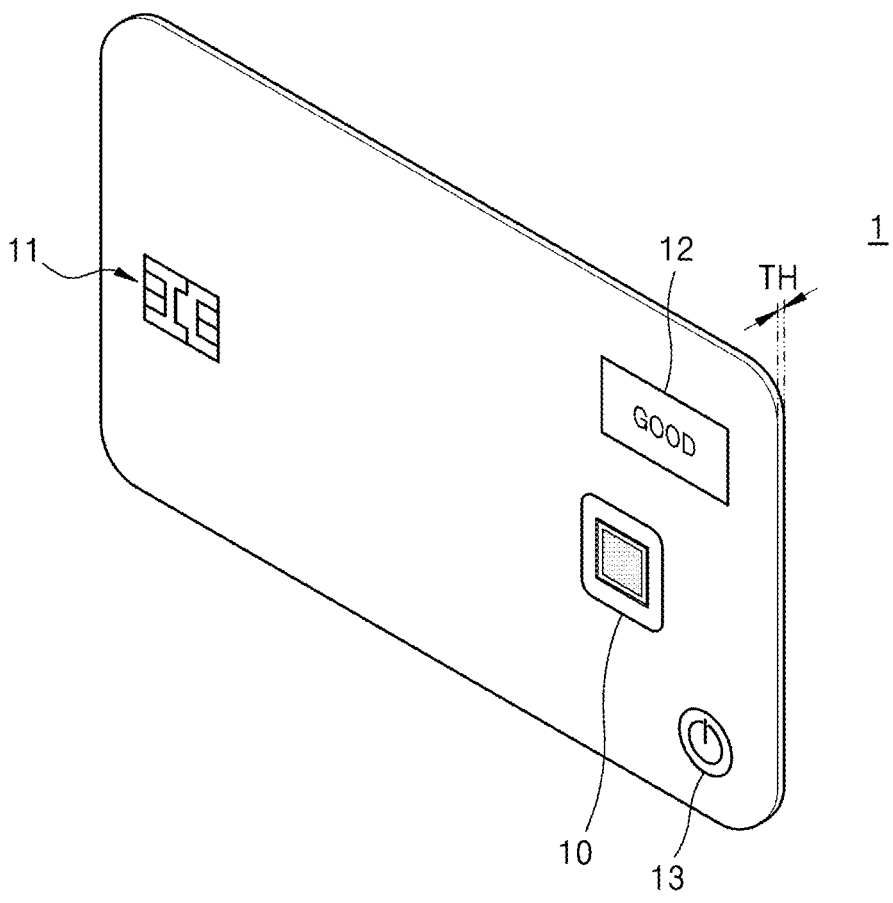
FIG. 1 is a schematic perspective view showing a smart card according to example embodiments of the inventive concepts.

Hereinafter, some example embodiments of the technical idea of the inventive concepts will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these terms are only used to distinguish one element, component, region, layer, or section, from another region, layer, or section and the elements, components, regions, layers, and/or sections, should not be otherwise limited by these terms. Thus, a first element, component, region, layer, or section, discussed below may be termed a second element, component, region, layer, or section, without departing from the scope of this disclosure.

Spatially relative terms, such as "lower," "upper," "plan" and/or the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, the device may be otherwise oriented (rotated 90 degrees or at other orientations) and the spatially relative descriptors used herein interpreted accordingly.

When the terms "about" or "substantially" are used in this specification in connection with a numerical value, it is intended that the associated numerical value includes a manufacturing or operational tolerance (e.g., ±10%) around the stated numerical value. Moreover, when the words "generally" and "substantially" are used in connection with geometric shapes, it is intended that precision of the geometric shape is not required but that latitude for the shape is within the scope of the disclosure. Further, regardless of whether numerical values or shapes are modified as "about" or "substantially," it will be understood that these values and shapes should be construed as including a manufacturing or operational tolerance (e.g., ±10%) around the stated numerical values or shapes.

Functional elements in the detailed description and the corresponding blocks shown in the drawings, unless indicated otherwise, may be implemented in processing circuitry such as hardware, software, or a combination thereof configured to perform a specific function. For example, the processing circuitry may include electrical components such as at least one of transistors, resistors, capacitors, etc. and/or may include electrical components such as logic gates including at least one of AND gates, OR gates, NAND gates, NOT gates, XOR gates, etc.

FIG. 1 is a schematic perspective view showing a smart card 1 according to example embodiments of the inventive concepts.

Referring to FIG. 1, the smart card 1 may include a fingerprint sensor package 10, a security chip 11, a display unit 12, and a power button 13.

The smart card 1 may further include a card number identification unit, an expiration date identification unit, and/or a memory chip that stores information displayed on a conventional credit card or check card (such as a user's name). The smart card 1 may further include an RF chip.

The fingerprint sensor package 10 may recognize (or detect) the fingerprint of a user when the user brings his or her fingerprint into contact with the fingerprint sensor. The fingerprint sensor package 10 may compare the recognized fingerprint with the registered fingerprint to determine whether the recognized fingerprint matches the registered fingerprint. In some example embodiments, the fingerprint sensor package 10 may operate after the smart card 1 is switched to an on state.

The security chip 11 may store encrypted financial information. When the recognized fingerprint matches the registered fingerprint, the security chip 11 may authorize (or grant) an operation of the smart card 1. For example, in some example embodiments, the security chip 11 may grant payment authorization to the user of the smart card 1. For example, based on the recognition result of the fingerprint sensor package 10, the security chip 11 grants a payment right to the user, so that the smart card 1 may prevent financial accidents caused by theft and/or loss.

The display unit 12 may display notifications related to the function or status of the smart card 1. For example, the display unit 12 may display at least one of whether the recognized fingerprint matches the registered fingerprint, whether the smart card 1 is in on or off state, whether better (or longer) contact with the fingerprint is required, and/or the like. The display unit may display letters, numbers, special symbols, and/or the like, and may further include a light emitting unit in some cases. In some example embodiments, the display unit 12 may be omitted, depending on the type of the smart card 1.

The power button 13 may turn on/off the smart card 1. The smart card 1 in the off state may be switched to the on state by the operation of the power button 13, and the smart card 1 in the on state may be switched to the off state by manipulating the power button 13. Also, when a set time elapses after the smart card 1 is switched to the on state, the smart card 1 may be automatically switched to the off state. However, the power button 13 may be omitted, depending on the type of the smart card 1.

In some embodiments, the thickness TH of the smart card 1 may range from about 0.5 mm to about 1 mm. For example, the thickness TH of the smart card 1 may be about 0.84 mm or less according to the international standard. For example, the thickness TH of the smart card 1 may be about 0.76 mm or less.

Since the smart card 1 of these embodiments include the fingerprint sensor package 10 and has the same thickness as a conventional credit card and/or check card, the smart card 1 may provide a high level of user functionality and/or experience. In addition, the cross-sectional view of the smart card 1 of these example embodiments may be substantially the same as or similar to that schematically shown in FIG. 10H.

FIGS. 2A to 2E are diagrams illustrating a fingerprint sensor package 10 according to example embodiments of the inventive concepts.

Figure 2A:
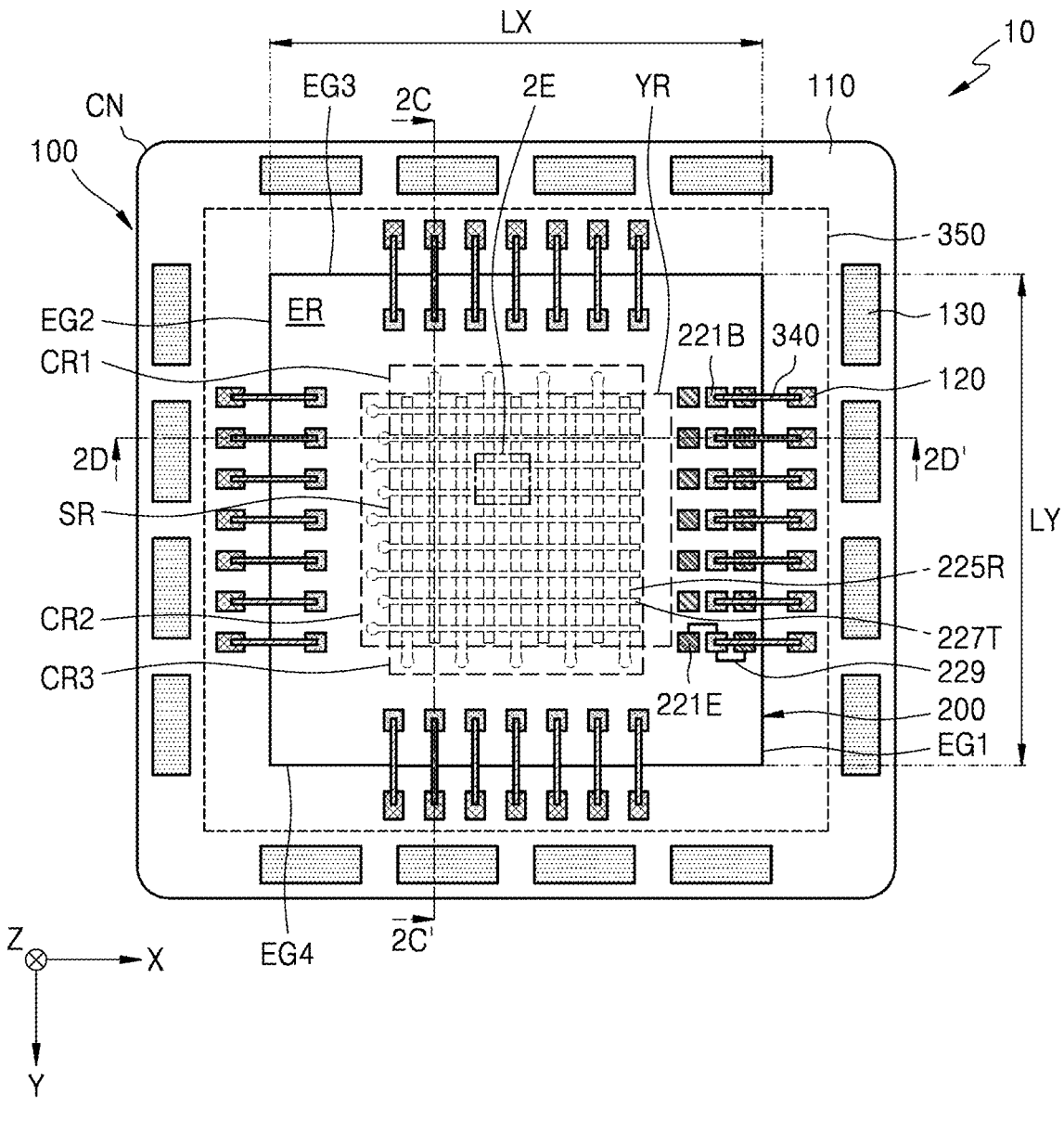
FIG. 2A is a bottom view schematically showing a layout of some components of a fingerprint sensor package according to example embodiments of the inventive concepts.
Figure 2B:
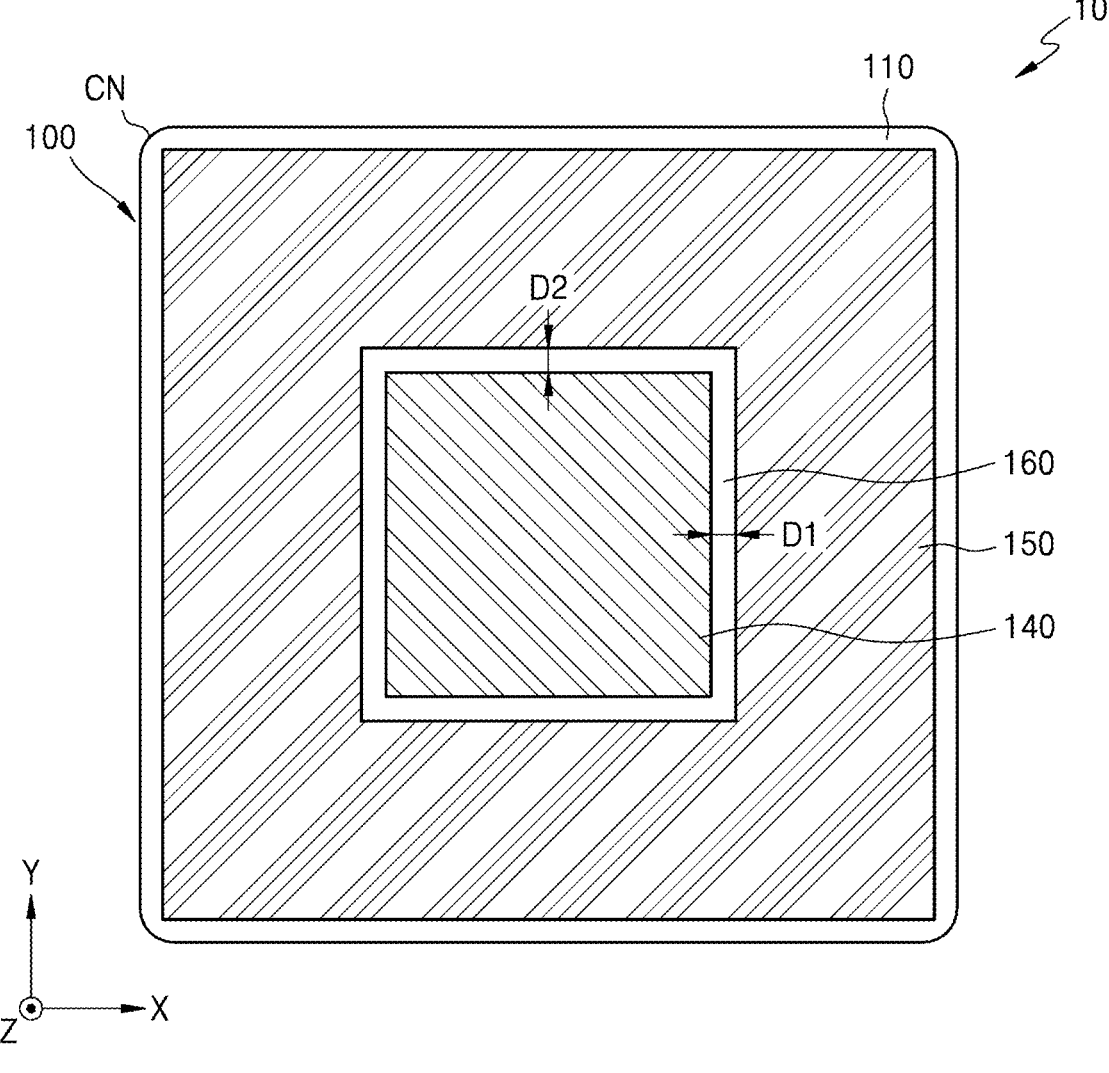
FIG. 2B is a plan view illustrating the fingerprint sensor package of FIG. 2A.
Figure 2C:
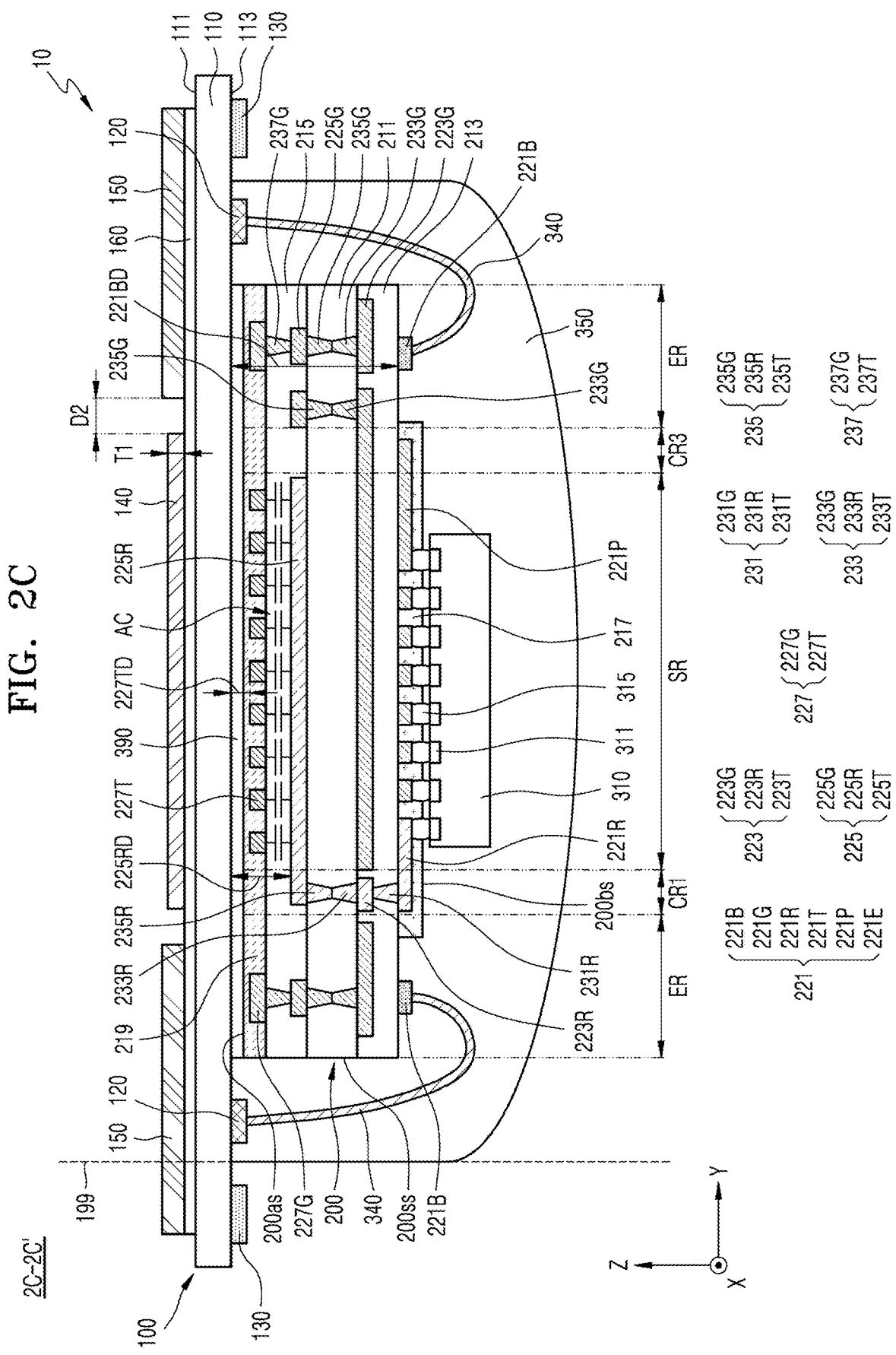
FIG. 2C is a cross-sectional view taken along the line 2C-2C' of FIG. 2A.
Figure 2D:
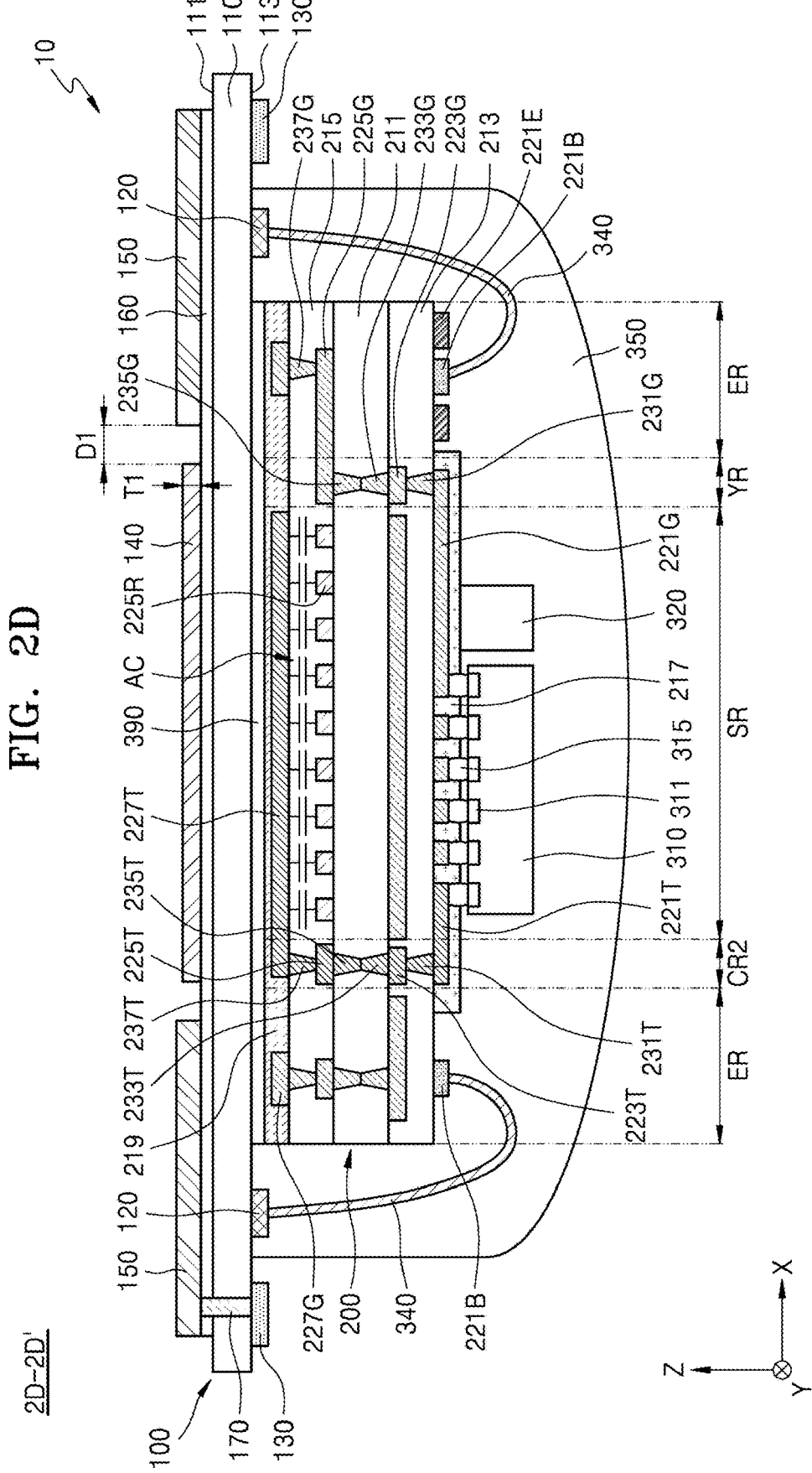
FIG. 2D is a cross-sectional view taken along the line 2D-2D' of FIG. 2A.
Figure 2E:
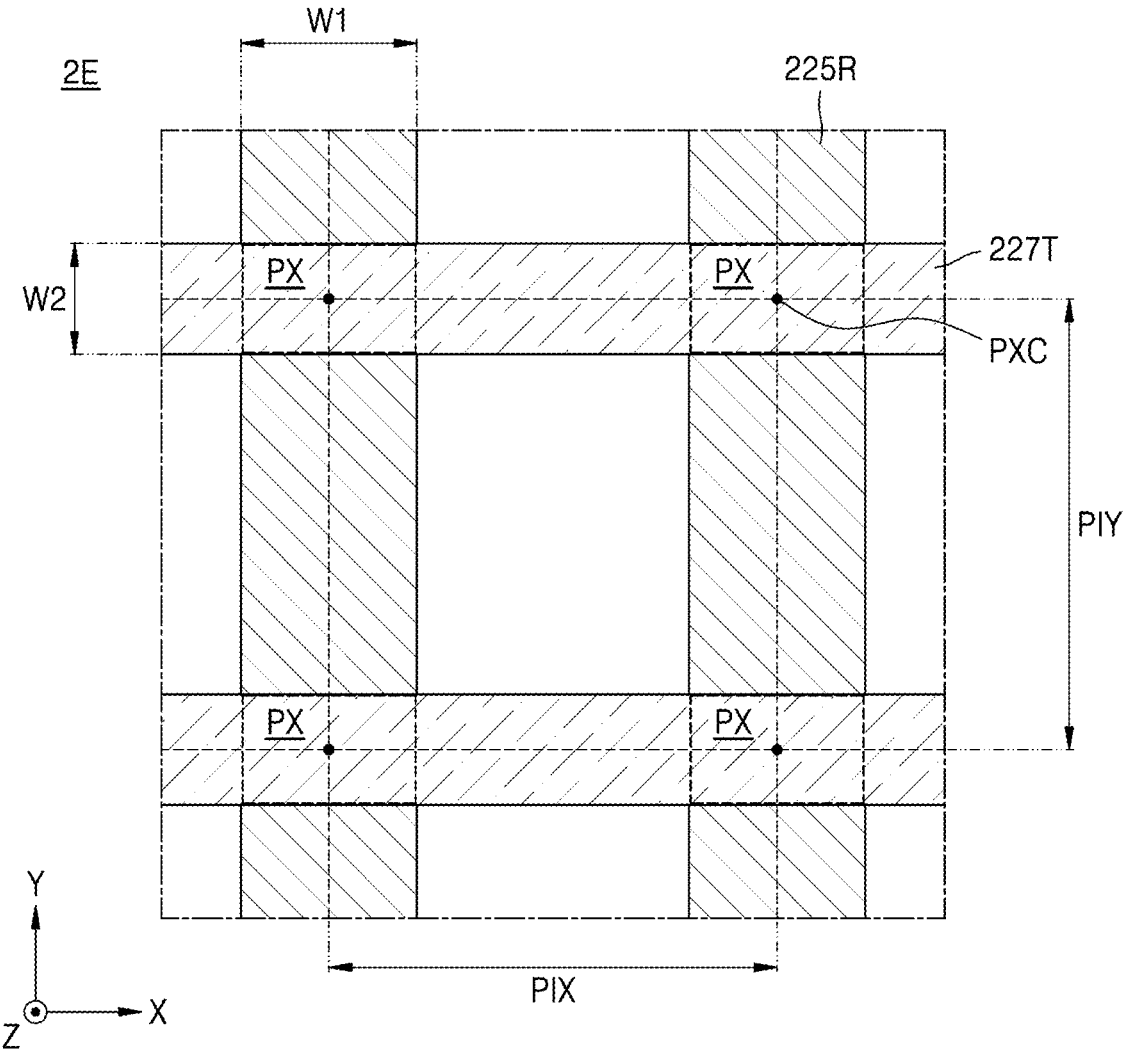
FIG. 2E is an enlarged view showing an enlarged area indicated by "2E" of FIG. 2A.

Specifically, FIG. 2A is a bottom view schematically showing the layout of some components of the fingerprint sensor package 10, FIG. 2B is a plan (or top) view showing the fingerprint sensor package 10 of FIG. 2A, FIG. 2C is a cross-sectional view taken along the line 2C-2C' of FIG. 2A, FIG. 2D is a cross-sectional view taken along the line 2D-2D' of FIG. 2A, and FIG. 2E is an enlarged view showing an enlarged area indicated by "2E" in FIG. 2A.

Referring to FIGS. 2A to 2E, the fingerprint sensor package 10 may include a first substrate 100, a second substrate 200, a controller chip 310, a passive element 320, and a molding layer 350.

The total thickness of the fingerprint sensor package 10 may be about 0.76 mm or less. In some embodiments, the total thickness of the fingerprint sensor package 10 may be about 0.5 mm or less. For example, in some embodiments, the total thickness of the fingerprint sensor package 10 may range from about 0.1 mm to about 0.4 mm. Accordingly, the fingerprint sensor package 10 may be easily applied to various products (e.g., the smart card of FIG. 1 described above) that are flexible and/or thin.

The first substrate 100 may include a core insulating layer 110, first bonding pads 120, external connection pads 130, a coating layer 140, a ground bezel 150, and an adhesive layer 160.

The first substrate 100 may include (or be) a printed circuit board (PCB). In some example embodiments, the first substrate 100 may include a flexible PCB (FPCB) having flexibility to be bendable. In other example embodiments, the first substrate 100 may include a rigid type PCB.

The core insulating layer 110 has a substantially film and/or plate shape, and may include a first surface 111 and a second surface 113 opposite to each other. Hereinafter, a direction parallel to a main surface (the first surface 111 or the second surface 113) of the core insulating layer 110 is referred to as a first direction (or X direction), a direction parallel to the main surface (the first surface 111 or the second surface 113) of the core insulating layer 110 and perpendicular to the first direction (X direction) is referred as a second direction (or Y direction), and a direction perpendicular to the main surface (the first surface 111 or the second surface 113) of the core insulating layer 110 is referred as a third direction (or Z direction). In addition, hereinafter, the horizontal width of a component refers to a length of the component in a direction (first direction (X direction) or second direction (Y direction)) parallel to the main surface (first surface 111 or second surface 113) of the core insulating layer 110.

The core insulating layer 110 may include an insulating material. For example, the core insulating layer 110 may be a flexible film including polyimide. For example, the core insulating layer 110 may be formed of an epoxy-based resin, an acrylic resin, a synthetic resin (such as acrylic, polyether nitrile, polyether sulfone, polyethylene terephthalate, polyethylene naphthalate, and/or the like), and/or the like.

The second surface 113 of the core insulating layer 110 may include a mounting region on which the second substrate 200 is mounted. The first bonding pads 120 may be provided on the second surface 113 of the core insulating layer 110 and may be laterally spaced apart from the mounting region. For example, the first bonding pads 120 may be arranged along at least one of edges of the mounting region of the core insulating layer 110. The first bonding pads 120 may be connected to the conductive wires 340, and may be electrically connected to the second bonding pads 221B of the second substrate 200 through the conductive wires 340.

The external connection pads 130 may be disposed on the second surface 113 of the core insulating layer 110. The external connection pads 130 may be disposed adjacent to the edge of the second surface 113 of the core insulating layer 110, and may be arranged along the edge of the second surface 113 of the core insulating layer 110. For example, the external connection pad 130 may be closer to the edge of the second surface 113 of the core insulating layer 110 than the first bonding pad 120. For example, the distance between the edge of the second surface 113 of the core insulating layer 110 and the external connection pad 130 may be smaller than the distance between the edge of the second surface 113 of the core insulating layer 110 and the first bonding pad 120. The external connection pad 130 may be a pad electrically and/or physically connected to an external device (e.g., the card main body 500 of FIG. 10G). The external connection pad 130 may be electrically connected to the first bonding pads 120 through a conductive pattern provided on (or in) the first substrate 100.

For example, the first bonding pads 120 and the external connection pads 130 may include a conductive material, such as at least one of copper (Cu), aluminum (Al), nickel (Ni), silver (Ag), gold (Au), platinum (Pt), tin (Sn), lead (Pb), titanium (Ti), chromium (Cr), palladium (Pd), indium (In), zinc (Zn), carbon (C), alloys thereof, and/or the like.

The coating layer 140 may be disposed on the first surface 111 of the core insulating layer 110. The coating layer 140 is a portion configured to be in contact with the user's fingerprint and may be disposed on the sensing region SR of the second substrate 200. In a plan view, the coating layer 140 may entirely cover the sensing region SR of the second substrate 200. The coating layer 140 may serve to protect the sensing region SR from external influences such as contamination, impact, scratches, and/or the like. Accordingly, the coating layer 140 may include high-strength glass and/or plastic, but is not limited thereto. In some embodiments, the coating layer 140 may include a material having a dielectric constant suitable for fingerprint recognition (e.g., a high-k material).

The thickness T1 of the coating layer 140 may be formed to be about 100 μm or less in consideration of the sensing sensitivity. In some embodiments, the thickness T1 of the coating layer 140 may be in a range of about 5 μm to about 100 μm.

The ground bezel 150 may be disposed on the first surface 111 of the core insulating layer 110 and disposed around the coating layer 140. The ground bezel 150 may extend along the circumference of the coating layer 140. When the coating layer 140 is positioned approximately at the center of the first surface 111 of the core insulating layer 110, the ground bezel 150 may be disposed at the outer portion of the first surface 111 of the core insulating layer 110. The ground bezel 150 may be disposed around the coating layer 140 to reduce sensing noise while a user's fingerprint is in contact with the coating layer 140. For example, the ground bezel 150 may include a conductive material, for example, a metal such as copper (Cu) or aluminum (Al).

The ground bezel 150 may be electrically grounded. In example embodiments, the ground bezel 150 may be configured to receive a reference potential through the conductive via 170 penetrating the core insulating layer 110 and the adhesive layer 160. The conductive via 170 is configured to electrically connect the ground bezel 150 and the external connection pad 130, and may be used as an electrical path for transmitting a reference potential to the ground bezel 150.

The ground bezel 150 may extend along the circumference of the coating layer 140 covering the sensing region SR. The ground bezel 150 may have a ring shape surrounding the coating layer 140 in a plan view. The distance between the ground bezel 150 and the coating layer 140 may be constant.

For example, the ground bezel 150 may be spaced apart from a portion of coating layer 140 by a first distance D1 in the first direction (X direction), and may be spaced apart from another portion of the coating layer 140 by a second distance D2 in the second direction (Y direction). In some embodiments, the first distance D1 and the second distance D2 may be substantially the same. In example embodiments, each of the first distance D1 and the second distance D2 may have a range of about 50 μm or more. In example embodiments, each of the first distance D1 and the second distance D2 may be about 5 mm or less. In some example embodiments, the ground bezel 150 may have a thickness in the third direction (Z direction) greater than an equivalent thickness of the coating layer 140.

The adhesive layer 160 may be disposed between the first surface 111 of the core insulating layer 110 and the coating layer 140, and between the first surface 111 of the core insulating layer 110 and the ground bezel 150. The adhesive layer 160 may attach the coating layer 140 to the core insulating layer 110 and the ground bezel 150 to the core insulating layer 110. For example, the adhesive layer 160 may be formed of an insulating adhesive.

In some example embodiments, each corner CN of the first substrate 100 may have a rounded shape. For example, the first substrate 100 may have a rectangular planar shape having rounded corners CN. In some embodiments, the radius of curvature of the corner CN of the first substrate 100 may be in a range of about 0.1 mm to about 2 mm. For example, the radius of curvature of the corner CN of the first substrate 100 may be about 1 mm. The roundness of the corners CN of the first substrate 100 may help effectively mitigate and/or prevent cracks that may occur in the edges near the corners CN during the process of cutting the first panel substrate 100P (refer to FIG. 10E) using a punching facility PM (refer to FIG. 10E).

The second substrate 200 may be disposed on the first substrate 100. The second substrate 200 may be mounted on the mounting region of the second surface 113 of the core insulating layer 110. A substrate adhesive layer 390 for attaching the second substrate 200 to the core insulating layer 110 may be arranged between the upper surface 200as of the second substrate 200 and the second surface 113 of the core insulating layer 110. The second substrate 200 may be electrically connected to the first substrate 100 through conductive wires 340.

The second substrate 200 may include a PCB. In example embodiments, the second substrate 200 may include a rigid type substrate. The second substrate 200 may have a substantially rectangular planar shape and/or a square planar shape. The second substrate 200 may include an upper surface 200as and a lower surface 200bs opposite to each other, the upper surface 200as of the second substrate 200 may be a surface in contact with the first substrate 100, and the lower surface 200bs of the second substrate 200 may be a surface on which components, such as the controller chip 310, are mounted.

The first length LX in the first direction (X direction) of the second substrate 200 may have a range between about 8 mm and about 15 mm, between about 9 mm and about 13 mm, and/or between about 10 mm and about 12 mm. In addition, the second length LY in the second direction (Y direction) of the second substrate 200 may have a range between about 8 mm and about 15 mm, between about 9 mm and about 13 mm, or between about 10 mm and about 12 mm. In some example embodiments, the first length LX and the second length LY may be substantially the same, and in some example embodiments, the first length LX and the second length LY may be different.

The second substrate 200 may include a base insulating layer 211, a lower insulating layer 213 on the lower surface of the base insulating layer 211, an upper insulating layer 215 on the upper surface of the base insulating layer 211, a lower protective layer 217 on the lower surface of the lower insulating layer 213, and an upper protective layer 219 on the upper surface of the upper insulating layer 215.

In some example embodiments, the second substrate 200 may be a multi-layered PCB including a plurality of conductive layers. The second substrate 200 may include conductive layers positioned at different vertical levels, and conductive vias for electrically connecting the conductive layers. The conductive layers and the conductive vias may include a conductive material, such as at least of copper (Cu), aluminum (Al), nickel (Ni), silver (Ag), gold (Au), platinum (Pt), tin (Sn), lead (Pb), titanium (Ti), chromium (Cr) palladium (Pd), indium (In), zinc (Zn), carbon (C), alloys thereof, and/or the like.

For example, the second substrate 200 may include a first conductive layer 221, a second conductive layer 223, a third conductive layer 225, and a fourth conductive layer 227 in the order of the distance from the first substrate 100 to the farthest. The first conductive layer 221 may be on the lower surface of the lower insulating layer 213, the second conductive layer 223 may be on the lower surface of the base insulating layer 211, the third conductive layer 225 may be on the upper surface of the base insulating layer 211, and the fourth conductive layer 227 may be on the upper surface of the upper insulating layer 215.

The first conductive layer 221 may include second bonding pads 221B, test pads 221E, first-first sensing pads 221R, first-second sensing pads 221T, a first ground pattern 221G, and a power pattern 221P. The second conductive layer 223 may include second-first sensing pads 223R, second-second sensing pads 223T, and a second ground pattern 223G. The third conductive layer 225 may include first sensing patterns 225R, third-second sensing pads 225T, and a third ground pattern 223G. The fourth conductive layer 227 may include second sensing patterns 227T and a fourth ground pattern 227G.

In addition, the second substrate 200 may include first conductive vias 231 for electrically connecting the first conductive layer 221 and the second conductive layer 223, second conductive vias 233 for electrically connecting the second conductive layer 223 and the third conductive layer 225, and third conductive vias 235 and fourth conductive vias 237 for electrically connecting the third conductive layer 225 and the fourth conductive layer 227. The first conductive vias 231 may at least partially penetrate the lower insulating layer 213, the second conductive vias 233 may partially penetrate the base insulating layer 211, the third conductive vias 235 may partially penetrate the base insulating layer 211, and the fourth conductive vias 237 may at least partially penetrate the upper insulating layer 215.

The first conductive vias 231 may include first-first sensing vias 231R for electrically connecting between the first-first sensing pads 221R and the second-first sensing pads 223R, first-second sensing vias 231T for electrically connecting between the first-second sensing pads 221T and the second-second sensing pads 223T, and a first ground via 231G for electrically connecting the first ground pattern 221G and the second ground pattern 223G. In some example embodiments, the first conductive vias 231 may have a tapered structure in which a horizontal width decreases toward the base insulating layer 211.

The second conductive vias 233 may include second-first sensing vias 233R for electrically connecting between the second-first sensing pads 223R and the first sensing patterns 225R, second-second sensing vias 233T for electrically connecting the second-second sensing pads 223T and the third-second sensing pads 225T, and a second ground via 233G for electrically connecting the second ground pattern 223G and the third ground pattern 223G. The third conductive vias 235 may include third-first sensing vias 235R for electrically connecting between the second-first sensing pads 223R and the first sensing patterns 225R, third-second sensing vias 235T for electrically connecting between the second-second sensing pads 223T and the third-second sensing pads 225T, and a third ground via 235G for electrically connecting the second ground pattern 223G and the third ground pattern 223G.

The second conductive vias 233 may contact the second conductive layer 223, the third conductive vias 235 may contact the third conductive layer 225, and the second conductive vias 233 and the third conductive vias 235 may contact each other. For example, the second-first sensing pads 223R and the first sensing patterns 225R may be electrically connected by the vertically connected second-first sensing vias 233R and third-first sensing vias 235R, and the second-second sensing pads 223T and the third-second sensing pads 225T may be electrically connected by the vertically connected second-second sensing vias 233T and third-second sensing vias 235T, and the second ground pattern 223G and the third ground pattern 223G may be electrically connected by the vertically connected second ground via 233G and third ground via 235G.

In some example embodiments, each of the second conductive vias 233 and the third conductive vias 235 may have a tapered structure in which the horizontal width decreases toward the center in the thickness direction of the base insulating layer 211. In some embodiments, the second conductive vias 233 and the third conductive vias 235 may have a smallest horizontal width at a contact surface therebetween.

The fourth conductive vias 237 may include fourth-second sensing vias 237T for electrically connecting the third-second sensing pads 225T and the second sensing patterns 227T, and a fourth ground via 237G for electrically connecting the third ground pattern 223G and the fourth ground pattern 227G. In some example embodiments, the fourth conductive vias 237 may have a tapered structure in which a horizontal width decreases toward the base insulating layer 211.

The second substrate 200 may include a sensing region SR, a first contact region CR1, a second contact region CR2, a third contact region CR3, an interconnect region YR, and a peripheral region ER. For example, the sensing region SR may be a region in which first and second sensing patterns 225R and 227T for fingerprint recognition are disposed. The first contact region CR1 and the third contact region CR3 may be regions in which first-first sensing vias 231R, second-first sensing vias 233R, and third-first sensing vias 235R for connecting the first sensing patterns 225R to the controller chip 310 are disposed. The second contact region CR2 may be a region in which first-second sensing vias 231T, second-second sensing vias 233T, third-second sensing vias 235T, and 4-2 sensing vias 237T for connecting the second sensing patterns 227T to the controller chip 310 are disposed. The interconnect region YR may be a region in which at least some of the first to fourth ground vias 231G, 233G, 235G, and 237G for connecting the fourth ground pattern 227G and the controller chip 310 are disposed.

The sensing region SR may be disposed in the center of the second substrate 200. In some embodiments, the sensing region SR may have a rectangular and/or square shape in the plan view. In the sensing region SR, a plurality of line-shaped first sensing patterns 225R spaced apart in a first direction (X direction) and extending in a second direction (Y direction) and a plurality of line-shaped second sensing patterns 227T spaced apart in the second direction (Y direction) and extending in the first direction (X direction) may be disposed. The plurality of first sensing patterns 225R and the plurality of second sensing patterns 227T may be spaced apart from the first substrate 100. For example, a distance 225RD between the plurality of first sensing patterns 225R and the first substrate 100 may be less than a distance 221BD between the second bonding pads 221B and the first substrate 100, and a distance 227TD between the plurality of second sensing patterns 227T and the first substrate 100 may be less than a distance 221BD between the second bonding pads 221B and the first substrate 100.

The first contact region CR1 may be formed at one end of the sensing region SR in the second direction (Y direction), and the third contact region CR3 may be formed at the other end of the sensing region SR in the second direction (Y direction). In addition, the second contact region CR2 may be formed at one end of the sensing region SR in the first direction (X direction), and the interconnect region YR may be formed at the other end of the sensing region SR in the first direction (X direction).

The peripheral region ER may be disposed on an outer portion of the second substrate 200. The peripheral region ER may surround the sensing region SR in the plan view. Second bonding pads 221B may be disposed in the peripheral region ER. First to fourth ground patterns 221G, 223G, 225G, and 227G for providing a reference potential and shielding sensing noise may be disposed in the peripheral region ER.

The first sensing patterns 225R may extend through the sensing region SR, between the sensing region SR and the first contact region CR1, and/or between the sensing region SR and the third contact region CR3. The first sensing patterns 225R may be connected to the controller chip 310 through the first-first sensing vias 231R, the second-first sensing vias 233R, and the third-first sensing vias 235R disposed in the first and third contact regions CR1 and CR3. In the first contact region CR1, each of the first-first sensing vias 231R, the second-first sensing vias 233R, and the third-first sensing vias 235R may be arranged in the first direction (X-direction). In addition, within the third contact region CR3, each of the first-first sensing vias 231R, the second-first sensing vias 233R, and the third-first sensing vias 235R may be arranged in the first direction (X-direction). Some of the first sensing patterns 225R may be connected to the first-first sensing vias 231R, the second-first sensing vias 233R, and the third-first sensing vias 235R disposed in the first contact region CR1. In addition, other portions of the first sensing patterns 225R may be connected to the first-first sensing vias 231R, the second-first sensing vias 233R, and the third-first sensing vias 235R disposed in the third contact region CR3. The adjacent first sensing patterns 225R may be electrically separated.

The second sensing patterns 227T may extend in the sensing region SR and the second contact region CR2. The second sensing patterns 227T may be connected to the controller chip 310 through the first-second sensing vias 231T, the second-second sensing vias 233T, the third-second sensing vias 235T, and the fourth-second sensing vias 237T disposed in the second contact region CR2. In some example embodiments, the first-second sensing vias 231T, the second-second sensing vias 233T, the third-second sensing vias 235T, and the fourth-second sensing vias 237T may be staggered in a zigzag in the second direction (Y direction).

The first sensing patterns 225R may have a first width W1 in a first direction (X direction), and the second sensing patterns 227T may have a second width W2 in the second direction (Y direction). In some embodiments, the first width W1 may be greater than the second width W2. For example, the first width W1 may have a range of about 2 to about 4 times the second width W2. In some embodiments, for example, the first width W1 may have a range of about 40 μm to about 70 μm, and the second width W2 may have a range of about 5 μm to about 25 μm.

A portion where the first sensing patterns 225R and the second sensing patterns 227T overlap in the third direction (Z direction) may constitute the pixels PX. The first pitch PIX in the first direction (X direction) between the centers PXC of the pixels PX may be substantially the same as the second pitch PIY in the second direction (Y direction) between the centers PXC of the pixels PX, but the examples are not limited thereto. For example, each of the first pitch PIX and the second pitch PIY may have a range of about 50 μm to about 90 μm.

The first sensing patterns 225R and the second sensing patterns 227T overlapping each other may define an area capacitance AC, and the first sensing patterns 225R and the second sensing patterns 227T may define a fringing capacitance. The pixels PX may have a combined capacitance value determined by an area capacitance AC and a fringing capacitance.

When the user's fingerprint contacts the coating layer 140, by the capacitance induced between the second sensing patterns 227T and the user's fingerprint, a capacitance value corresponding to each of the pixels PX is changed. Since the change in the capacitance value is determined according to the shape of the user's fingerprint, the controller chip 310 may identify a user's fingerprint from a change in capacitance values of the pixels PX.

The fourth ground pattern 227G may surround the sensing region SR in which the second sensing patterns 227T are disposed in a plan view. The fourth ground pattern 227G may be positioned at the same vertical level as the second sensing patterns 227T, and may surround the second sensing patterns 227T in a plan view. For example, the fourth ground pattern 227G continuously extends along the edge of the sensitive region SR on the upper surface of the upper insulating layer 215 to surround the second sensing patterns 227T in a plan view. The fourth ground pattern 227G may be disposed around the sensing region SR to reduce sensing noise while a user's fingerprint is in contact with the coating layer 140.

The base insulating layer 211 may include an insulating material. For example, the base insulating layer 211 may include resin and/or glass fiber. The resin included in the base insulating layer 211 may be at least one selected from a phenol resin, an epoxy resin, and a polyimide. In some embodiments, the base insulating layer 211 may include at least one of Flame Retardant 4 (FR4), tetrafunctional epoxy, polyphenylene ether, epoxy/polyphenylene oxide, thermount, Bismaleimide Triazine (BT), cyanate ester, polyimide, prepreg, Ajinomoto Build-up Film (ABF), and/or liquid crystal polymer. In other embodiments, the base insulating layer 211 may include silicon oxide, silicon nitride, silicon oxynitride, and/or a combination thereof. The glass fiber included in the base insulating layer 211 may be a reinforcing material, and may be formed through a treatment of a glass filament obtained by melt-spinning a glass material at a high temperature. The glass filament may be an ore processing product including, e.g., silica as a main component.

The second conductive layer 223 may include second-first sensing pads 223R, second-second sensing pads 223T, and a second ground pattern 223G to which a reference potential is applied. The second ground pattern 223G may be disposed in the sensing region SR, the interconnect region YR, and the peripheral region ER. A portion of the second ground pattern 223G may overlap the first sensing patterns 225R and the second sensing patterns 227T in the third direction (Z direction). A portion of the second ground pattern 223G may be arranged between the second sensing patterns 227T and the controller chip 310. Accordingly, the second ground pattern 223G may block external sensing noise from the controller chip 310. The second-first sensing pads 223R may be disposed in first and third contact regions CR1 and CR3, and the second-second sensing pads 223T may be disposed in a second contact region CR2. The second-first sensing pads 223R may provide a path for electrical connection between the first sensing patterns 225R and the controller chip 310, and the second-second sensing pads 223T may provide a path for electrical connection between the second sensing patterns 227T and the controller chip 310.

The lower insulating layer 213 may be disposed on the lower surface of the base insulating layer 211 to cover the second conductive layer 223. The lower insulating layer 213 may electrically isolate the second-first sensing pads 223R, the second-second sensing pads 223T, and the second ground pattern 223G from each other.

The third conductive layer 225 may include a third ground pattern 225G to which a reference potential is applied, first sensing patterns 225R for recognizing a user's fingerprint, and third-second sensing pads 225T. The first sensing patterns 225R may be disposed in the sensing region SR, the third ground pattern 225G may be disposed in the interconnect region YR and the peripheral region ER, and the third-second sensing pads 225T may be disposed in the second contact region CR2. The third-second sensing pads 225T may provide a path for electrical connection between the second sensing patterns 227T and the controller chip 310.

The upper insulating layer 215 may be disposed on the upper surface of the insulating layer 211 to cover the third conductive layer 225. The upper insulating layer 215 may electrically isolate the first sensing patterns 225R, the third-second sensing pads 225T, and the third ground pattern 223G from each other.

The lower insulating layer 213 and the upper insulating layer 215 may include different materials. For example, the upper insulating layer 215 may include a material having a dielectric constant suitable for fingerprint recognition of the fingerprint sensor package 10. However, the example embodiments are not limited thereto, and the lower insulating layer 213 and the upper insulating layer 215 may include the same material.

The lower insulating layer 213 and/or the upper insulating layer 215 may include at least one of a phenol resin, an epoxy resin, and/or a polyimide. In some embodiments, each of the lower insulating layer 213 and the upper insulating layer 215 may include at least one selected from prepreg, FR4, quadrilateral epoxy, polyphenylene ether, epoxy/polyphenylene oxide, thermount, BT, cyanate ester, polyimide, liquid crystal polymer, and/or the like.

The fourth conductive layer 227 may be disposed on the upper surface of the upper insulating layer 215. The fourth conductive layers 227 may include a fourth ground pattern 227G for removing sensing noise and second sensing patterns 227T for recognizing a user's fingerprint. The second sensing patterns 227T may be disposed in the sensing region SR, and the fourth ground pattern 227G may be disposed in the peripheral region ER.

The second sensing patterns 227T may be spaced apart from the first sensing patterns 225R in a third direction (Z direction) with the upper insulating layer 215 arranged therebetween. The second sensing patterns 227T may be electrically insulated from the first sensing patterns 225R by the upper insulating layer 215. Accordingly, the first sensing patterns 225R may constitute the first electrode of the capacitor, the upper insulating layer 215 may constitute a dielectric layer of the capacitor, and the second sensing patterns 227T may constitute a second electrode of the capacitor. For example, capacitors constituting the fingerprint sensor may be formed in the second substrate 200.

The upper protective layer 219 may be disposed on the upper surface of the upper insulating layer 215 to cover the fourth conductive layers 227.

A first conductive layer 221 may be disposed on a lower surface of the lower insulating layer 213. The first conductive layer 221 may include second bonding pads 221B, test pads 221E, first-first sensing pads 221R, first-second sensing pads 221T, and a first ground pattern 221G to which a reference potential (e.g., a ground voltage) is applied.

The second bonding pads 221B may be disposed near the edge of the second substrate 200 and may be arranged in a direction parallel to the edge of the second substrate 200. As shown in FIG. 2A, when the second substrate 200 has first to fourth edges EG1, EG2, EG3, and EG4, second bonding pads 221B may be respectively disposed near the first to fourth edges EG1, EG2, EG3, and EG4 of the second substrate 200. The second bonding pads 221B disposed near the first edge EG1 of the second substrate 200 may be arranged in a row in the second direction (Y direction) parallel to the first edge EG1 of the second substrate 200. The second bonding pads 221B disposed near the second edge EG2 of the second substrate 200 may be arranged in a row in the second direction (Y direction) parallel to the second edge EG2 of the second substrate 200. The second bonding pads 221B disposed near the third edge EG3 of the second substrate 200 may be arranged in a row in the first direction (X direction) parallel to the third edge EG3 of the second substrate 200, and the second bonding pads 221B disposed near the fourth edge EG4 of the second substrate 200 may be arranged in a row in the first direction (X direction) parallel to the fourth edge EG4 of the second substrate 200.

The second bonding pads 221B may be connected to the conductive wires 340, and may be electrically connected to the first bonding pads 120 of the first substrate 100 through the conductive wires 340. The second bonding pads 221B may include a power pad to which power (e.g., power potential) provided from an external device is applied, a ground pad to which a reference potential is applied, and an output pad for outputting the fingerprint recognition result of the fingerprint sensor package 10 to the outside (e.g., the display unit 12 of the smart card 1 of FIG. 1). The controller chip 310 may receive the power potential through some of the second bonding pads 221B and the power supply pattern 221P, and may receive the reference potential through some of the second bonding pads 221B and the first ground pattern 221G. Also, the controller chip 310 may receive signals recognized from the first and second sensing patterns 225R and 227T through the first-first sensing pads 221R and the first-second sensing pads 221T.

The test pads 221E may be disposed near the edge of the second substrate 200, and may be arranged in a direction parallel to the edge of the second substrate 200 and/or in an arrangement direction of the second bonding pads 221B. In some example embodiments, as shown in FIG. 2A, the test pads 221E are disposed near the first edge EG1 of the second substrate 200 and may be arranged in a second direction (Y direction) parallel to the first edge EG1 of the second substrate 200. At least one of the test pads 221E may be electrically connected to at least one of the second bonding pads 221B through a conductive connection pattern 229.

In some example embodiments, the test pads 221E may include inner test pads 221E and outer test pads 221E spaced apart from each other in a direction (e.g., the X direction) perpendicular to the first edge EG1 of the second substrate 200.

The outer test pads 221E may be arranged between the second bonding pads 221B and the first edge EG1 of the second substrate 200. The inner test pads 221E may be spaced apart from the first edge EG1 of the second substrate 200 with the second bonding pads 221B arranged therebetween. The inner test pads 221E may be disposed between the second bonding pads 221B and the controller chip 310. At least one of the outer test pads 221E may overlap the conductive wire 340 in a vertical direction (e.g., a Z direction). The outer test pads 221E may be arranged in a row in a second direction (Y direction) parallel to the first edge EG1 of the second substrate 200, and the inner test pads 221E may be arranged in a row in a second direction (Y direction) parallel to the first edge EG1 of the second substrate 200. The outer test pads 221E and the inner test pads 221E may be spaced apart from each other with the second bonding pads 221B arranged therebetween.

In example embodiments, each of the length in the first direction (X direction) and the length in the second direction (Y direction) of the test pad 221E may be between about 150

µm and about 350 µm, between about 180 µm and about 330 µm, and/or between about 200 µm and about 300 µm. In example embodiments, a planar area of the test pad 221E may be greater than a planar area of the second bonding pad 221B. For example, the length of the test pad 221E in the first direction (X-direction) may be greater than the length of the second bonding pad 221B in the first direction (X-direction). For example, the length of the test pad 221E in the second direction (Y direction) may be greater than the length of the second bonding pad 221B in the second direction (Y direction).

The first-first sensing pads 221R may extend from the first and third contact regions CR1 and CR3 to a portion overlapping the controller chip 310 in a third direction (Z direction), and the first-second sensing pads 221T may extend from the second contact region CR2 to a portion overlapping the controller chip 310 in the third direction (Z direction). The first-first sensing pads 221R may provide a path for electrical connection between the first sensing patterns 225R and the controller chip 310, and the first-second sensing pads 221T may provide a path for electrical connection between the second sensing patterns 227T and the controller chip 310.

The lower protective layer 217 may be disposed on the lower surface of the lower insulating layer 213 to cover at least a portion of the first conductive layer 221. In some example embodiments, the lower protective layer 217 may be formed to cover a portion of a lower surface of the lower insulating layer 213. In other example embodiments, the lower protective layer 217 may be formed to entirely cover the lower surface of the lower insulating layer 213.

Each of the lower protective layer 217 and the upper protective layer 219 may be included in the insulating coating layer 140. In some embodiments, the lower protective layer 217 and the upper protective layer 219 may be solder resist. In some embodiments, the lower protective layer 217 and the upper protective layer 219 may include a polymer material having excellent heat resistance, insulating properties, and/or mechanical strength. For example, each of the lower protective layer 217 and the upper protective layer 219 may include polyimide, polyamide, polyacetal, polycarbonate, and/or the like.

The controller chip 310 and the passive element 320 may be disposed on the lower surface 200bs of the second substrate 200. The controller chip 310 may be mounted on the lower surface of the second substrate 200 in a flip-chip manner. Connection bumps 315 for electrically and physically connecting the controller chip 310 and the second substrate 200 may be disposed between the controller chip 310 and the second substrate 200. The connection bumps 315 may be disposed between some patterns of the first conductive layer 221 and the chip pads 311 of the controller chip 310.

In some embodiments, the controller chip 310 may entirely or partially overlap the sensing region SR. In other embodiments, the controller chip 310 may be disposed entirely outside the sensing region SR. The controller chip 310 may be configured to perform an operation for recognizing a user's fingerprint from a change in capacitance of the pixels PX. For example, the controller chip 310 may include processing circuitry like a memory chip and/or a processor chip. In addition, the passive element 320 may include, for example, a multi-layer ceramic capacitor (MLCC), but is not limited thereto.

The molding layer 350 may be disposed on the first substrate 100 to cover the second substrate 200, the controller chip 310, and the passive element 320. The molding layer 350 may serve to protect the second substrate 200, the controller chip 310, and the passive element 320 from external influences such as contamination and/or impact. In addition, the molding layer 350 may cover the first bonding pads 120 disposed on the second surface 113 of the core insulating layer 110, but not cover the external connection pads 130 to be exposed to the outside of the molding layer 350. The molding layer 350 may extend along a boundary 199 between the region in which the first bonding pads 120 are disposed and the region in which the external connection pads 130 are disposed, on the second surface 113 of the core insulating layer 110. The molding layer 350 may extend laterally from the side surface 200ss of the second substrate 200 to cover the first bonding pad 120, but may be spaced apart from the external connection pads 130. For example, as shown in FIGS. 2C and 2D, the molding layer 350 may extend in a lateral direction (e.g., the first direction (X direction) and/or the second direction (Y direction)) from the side surface 200ss of the second substrate 200 to the boundary 199 between the first bonding pads 120 and the external connection pads 130.

The molding layer 350 may be formed of an epoxy molding compound, an epoxy-based material, a thermosetting material, a thermoplastic material, a UV-treated material, and/or the like.

Since the sensing region SR corresponding to the fingerprint recognition sensor is included in the second substrate 200 itself, the overall thickness may be reduced, and the fingerprint sensor package 10 may be used in, e.g., a smart card having a thickness equivalent to that of a conventional credit card and check card.

Figure 3:
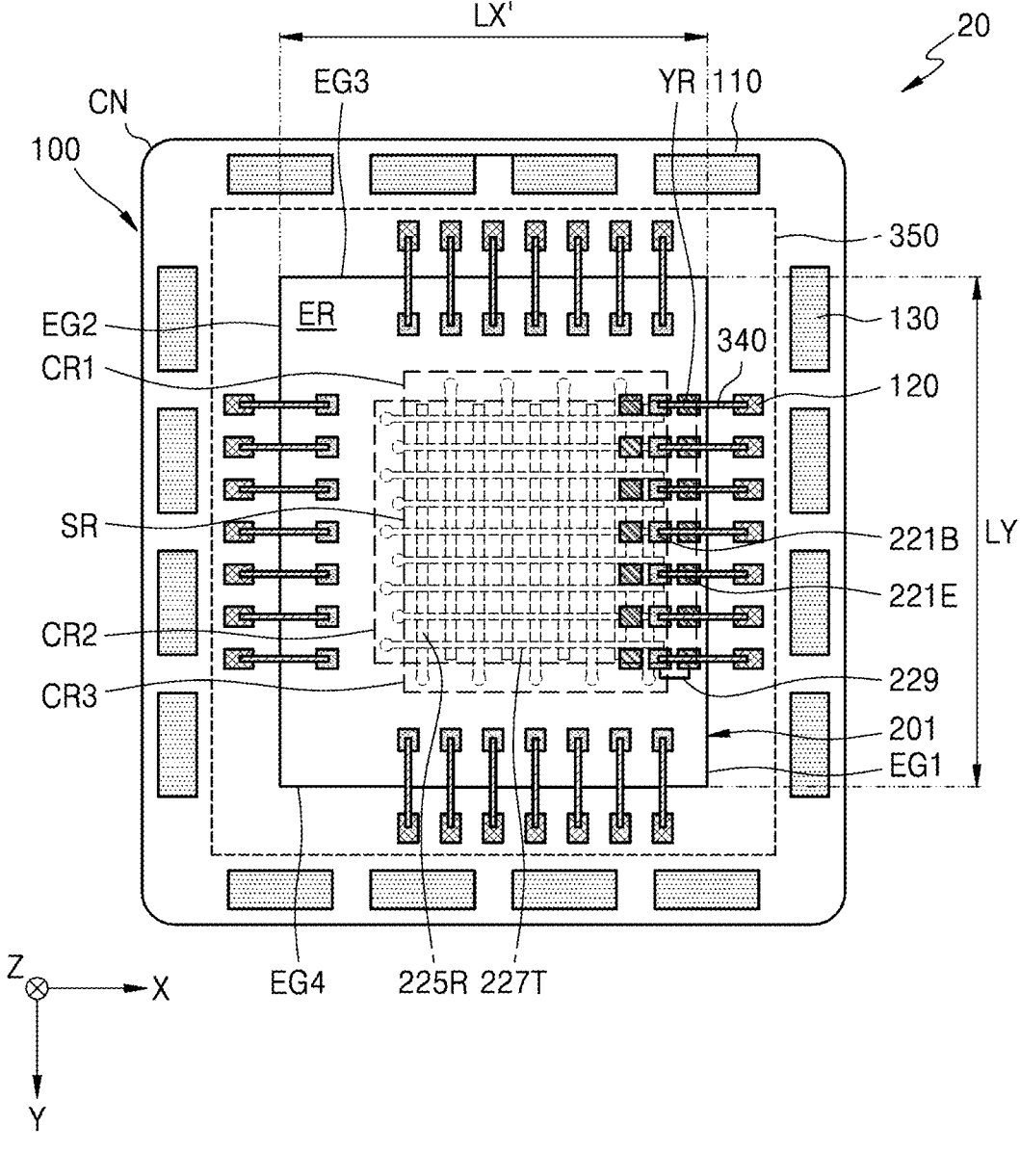
FIG. 3 is a bottom view schematically showing a layout of some components of a fingerprint sensor package according to example embodiments of the inventive concepts.

FIG. 3 is a bottom view schematically showing the layout of some components of the fingerprint sensor package 20 according to example embodiments of the inventive concepts.

The fingerprint sensor package 20 shown in FIG. 3 may be substantially the same as or similar to the fingerprint sensor package 10 described with reference to FIGS. 2A to 2E except for the layout of the test pads 221E and the second bonding pads 221B provided on the second substrate 201. Hereinafter, the fingerprint sensor package 20 of FIG. 3 will be described with a focus on differences from the fingerprint sensor package 10 described with reference to FIGS. 2A to 2E.

Referring to FIG. 3, at least one test pad 221E may be entirely or partially disposed in the sensing region SR of the second substrate 201. For example, the at least one test pad 221E may entirely or partially overlap at least one of the first sensing patterns 225R and at least one of the second sensing patterns 227T in the third direction (Z direction).

The test pads 221E may include inner test pads 221E spaced apart from the first edge EG1 of the second substrate 201 with the second bonding pads 221B arranged therebetween and outer test pads 221E between the second bonding pads 221B and the first edge EG1 of the second substrate 201. Each of the inner test pads 221E may be entirely or partially disposed within the sensing region SR of the second substrate 201, and each of the outer test pads 221E may be entirely or partially disposed in the interconnect region YR and/or the peripheral region ER of the second substrate 201. In addition, each of second bonding pads 221B provided between the inner test pads 221E and the outer test pads 221E may be entirely or partially disposed within the sensing region SR and/or the interconnect region YR of the second substrate 201. For example, the second bonding pads 221B provided between the inner test pads 221E and the outer test pads 221E may overlap at least one of the first sensing patterns 225R and at least one of the second sensing patterns 227T in the third direction (Z direction).

In some example embodiments, all the test pads 221B may be entirely or partially disposed within the sensing region SR of the second substrate 201. In these cases, each of the inner test pads 221E may be entirely disposed in the sensing region SR of the second substrate 201, each of the second bonding pads 221B may be entirely disposed in the sensing region SR of the second substrate 201, and each of the outer test pads 221E may be entirely or partially disposed in the sensing region SR of the second substrate 201.

When at least some of the test pads 221B of the second substrate 201 are disposed in the sensing region SR of the second substrate 201, compared to a case where all the test pads 221B are disposed in the peripheral region ER of the second substrate 201, the first length LX' in the first direction (X direction) of the second substrate 201 may be reduced so that it is possible to reduce the size of the second substrate 201 and the fingerprint sensor package 20.

Figure 4:
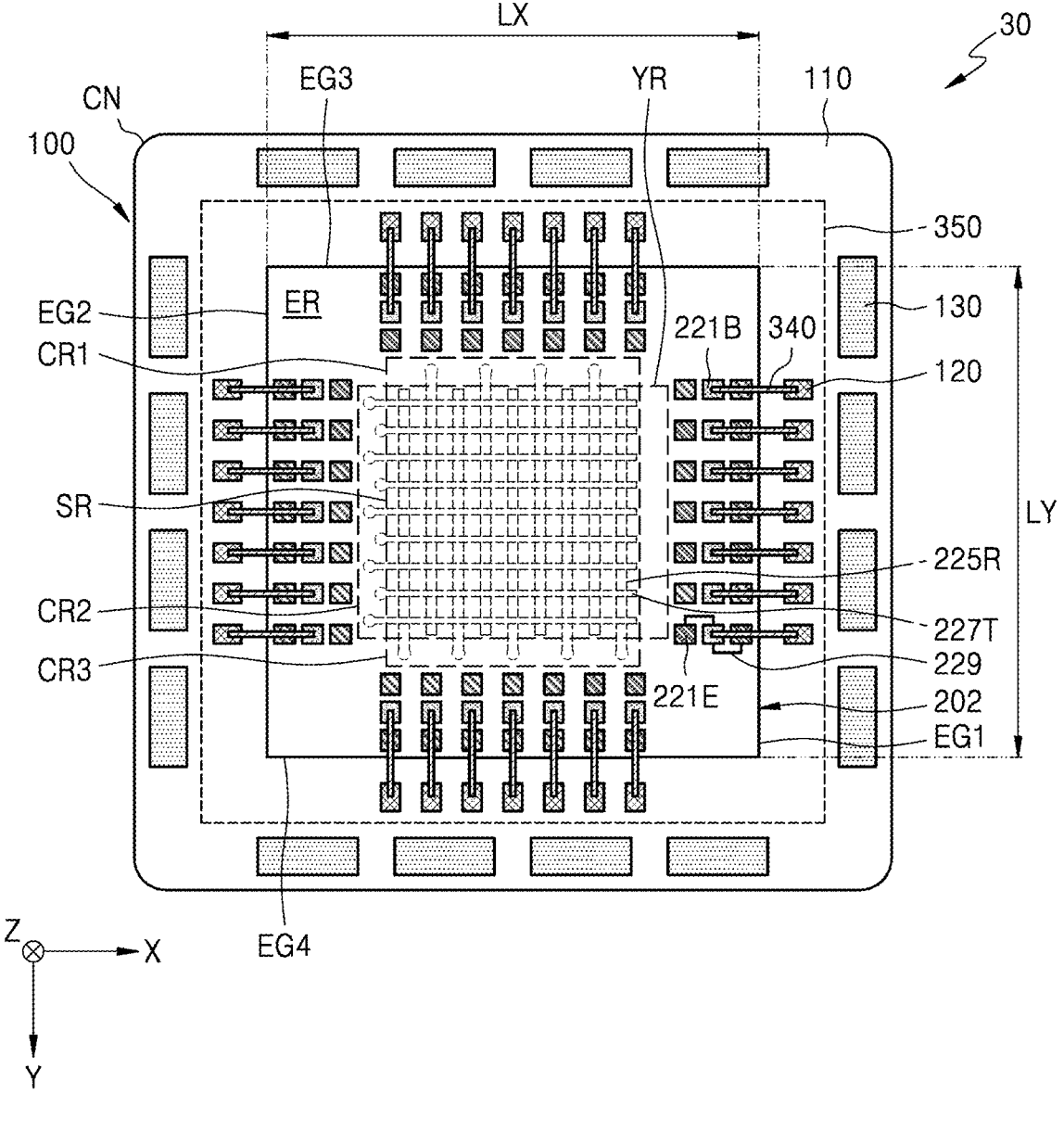
FIG. 4 is a bottom view schematically showing a layout of some components of a fingerprint sensor package according to example embodiments of the inventive concepts.

FIG. 4 is a bottom view schematically showing the layout of some components of the fingerprint sensor package 30 according to example embodiments of the inventive concepts.

The fingerprint sensor package 30 shown in FIG. 4 may be substantially the same as or similar to the fingerprint sensor package 10 described with reference to FIGS. 2A to 2E except for the layout of the test pads 221E provided on the second substrate 202. Hereinafter, the fingerprint sensor package 30 of FIG. 4 will be described with a focus on differences from the fingerprint sensor package 10 described with reference to FIGS. 2A to 2E.

Referring to FIG. 4, second test pads 221E may be disposed near each of the first to fourth edges EG1, EG2, EG3, and EG4 of the second substrate 200. The second test pads 221E disposed near the first edge EG1 of the second substrate 200 may be arranged in a second direction (Y direction) parallel to the first edge EG1 of the second substrate 200, the second test pads 221E disposed near the second edge EG2 of the second substrate 200 may be arranged in a second direction (Y direction) parallel to the second edge EG2 of the second substrate 200, the second test pads 221E disposed near the third edge EG3 of the second substrate 200 may be arranged in a first direction (X direction) parallel to the third edge EG3 of the second substrate 200, and the second test pads 221E disposed near the fourth edge EG4 of the second substrate 200 may be arranged in a first direction (X direction) parallel to the fourth edge EG4 of the second substrate 200.

Figure 5:
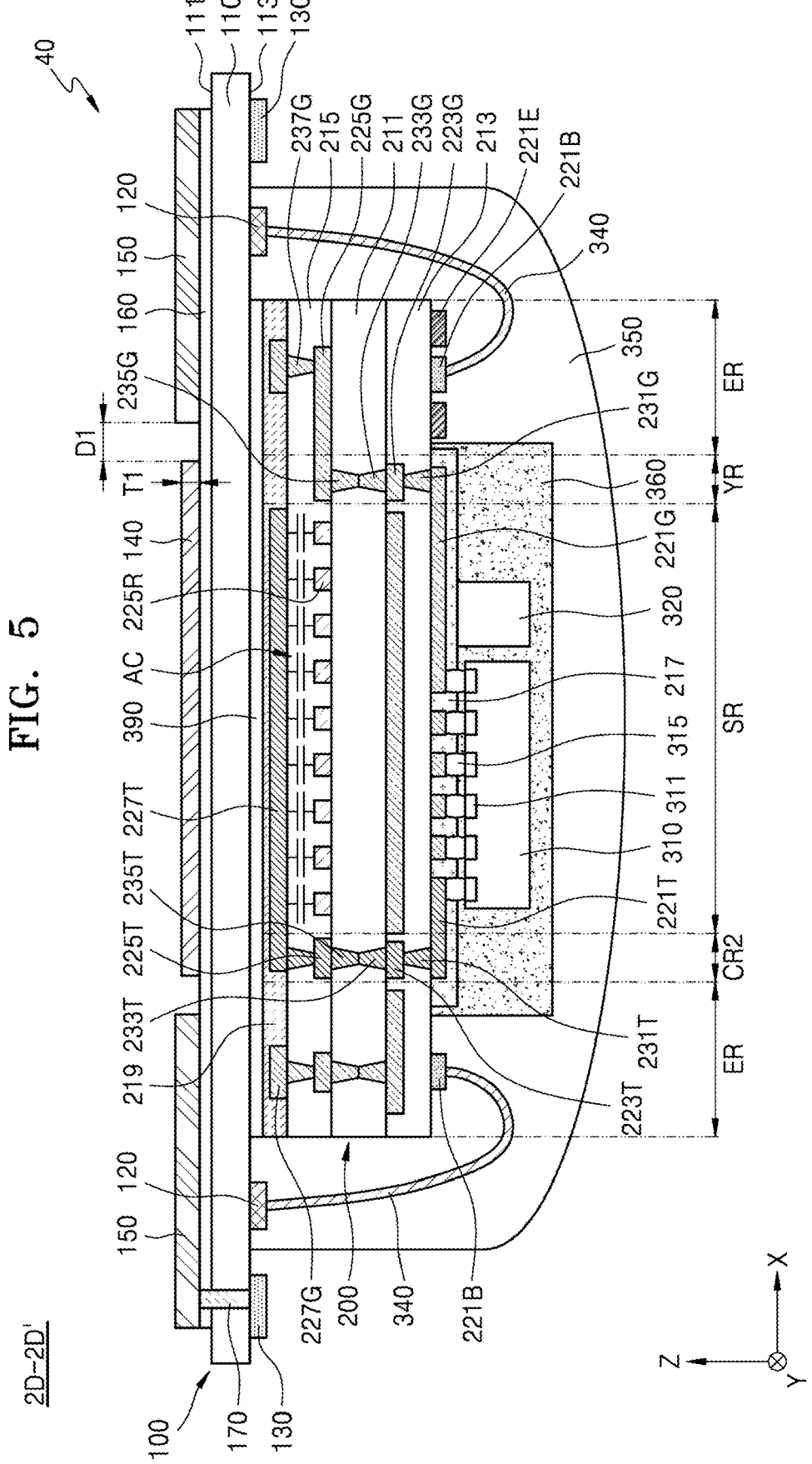
FIG. 5 is a cross-sectional view illustrating a fingerprint sensor package according to example embodiments of the inventive concepts.

FIG. 5 is a cross-sectional view illustrating a fingerprint sensor package 40 according to example embodiments of the inventive concepts.

The fingerprint sensor package 40 shown in FIG. 5 may be substantially the same as or similar to the fingerprint sensor package 10 described with reference to FIGS. 2A to 2E except that the fingerprint sensor package 20 further includes the inner molding layer 360. Though the fingerprint sensor package 40 is describe in comparison to the fingerprint sensor package 10, the example embodiments are not limited thereto. For example, the inner molding layer 360 may also be applied to any of the example embodiments described above. Hereinafter, the fingerprint sensor package 40 of FIG. 5 will be described with a focus on differences from the fingerprint sensor package 10 described with reference to FIGS. 2A to 2E.

Referring to FIG. 5, the inner molding layer 360 may be disposed on the lower surface of the second substrate 200 to cover the controller chip 310 and the passive element 320. In the manufacturing process of the fingerprint sensor package 40, the molding layer 350 may be formed after the inner molding layer 360 is formed. The inner molding layer 360 may be formed on the lower surface of the second substrate 200 to cover the controller chip 310 and the passive element 320, and the molding layer 350 may be formed to cover the inner molding layer 360. The inner molding layer 360 may be between the controller chip 310 and the molding layer 350, and between the passive element 320 and the molding layer 350. The inner molding layer 350 may extend along the lower surface of the second substrate 200 and may be spaced apart from the second bonding pads 221B and the test pads 221E. The second bonding pads 221B and the test pads 221E are not covered by the inner molding layer 350 and may directly contact the molding layer 350.

The inner molding layer 360 may be formed of an epoxy molding compound, an epoxy-based material, a thermosetting material, a thermoplastic material, a UV-treated material, and/or the like. In some embodiments, the molding layer 350 may be formed of a transparent material or a semi-transparent material. In these cases, as the molding layer 350 is formed of a transparent material or a semi-transparent material, the shape of the inner molding layer 360 may be confirmed from the outside.

Figure 6:
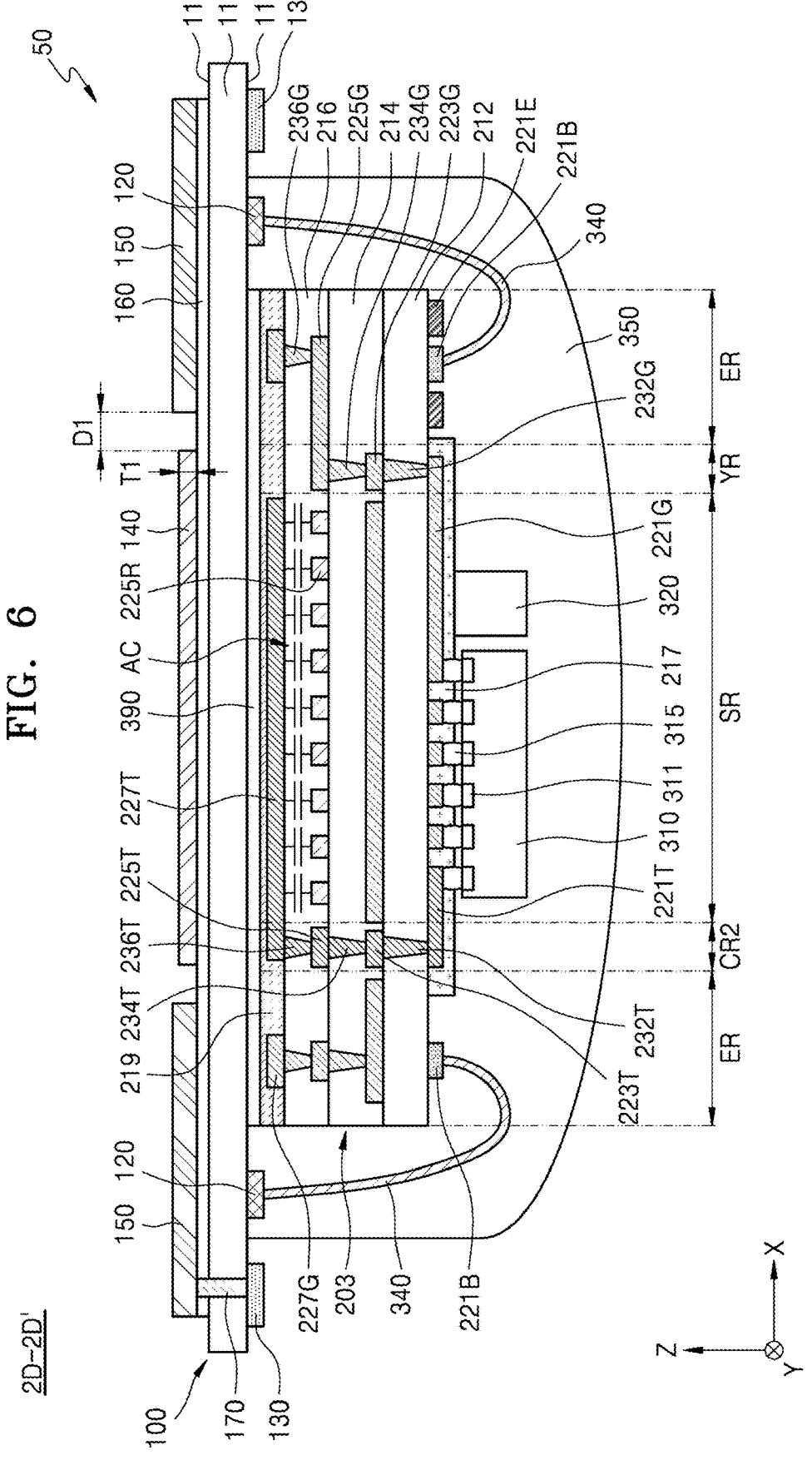
FIG. 6 is a cross-sectional view illustrating a fingerprint sensor package according to example embodiments of the inventive concepts.

FIG. 6 is a cross-sectional view illustrating a fingerprint sensor package 50 according to example embodiments of the inventive concepts.

Except for the second substrate 203, the fingerprint sensor package 50 shown in FIG. 6 may be substantially the same as or similar to the fingerprint sensor package 10 described with reference to FIGS. 2A to 2E. Hereinafter, the fingerprint sensor package 50 of FIG. 6 will be described with a focus on differences from the fingerprint sensor package 10 described with reference to FIGS. 2A to 2E.

Referring to FIG. 6, the fingerprint sensor package 50 may include a first substrate 100, a second substrate 203, a controller chip 310, a passive element 320, a conductive wire 340, and a molding layer 350.

In the second substrate 203 a base layer (e.g., the base insulating layer 211 of FIGS. 2A to 2E) may be omitted. The second substrate 203 is an insulating material and may include first to third insulating layers 212, 214, and 216. Referring to FIG. 6, the fingerprint sensor package 50 may include a first substrate 100, a second substrate 203, a controller chip 310, a passive element 320, a conductive wire 340, and a molding layer 350. The first conductive vias 232G and 232T, the second conductive vias 234G and 234T, and the third conductive vias 236G and 236T may have a structure tapered toward the lower surface of the second substrate 203 in contact with the controller chip 310.

The first insulating layer 212 may be disposed on the lower protective layer 217. The first conductive vias 232G and 232T may penetrate the first insulating layer 212, and contact the first conductive layers 221B, 221E, 221G, and 221T on the lower surface of the first insulating layer 212 and the second conductive layers 223G and 223T on the upper surface of the first insulating layer 212.

The second insulating layer 214 may be disposed on the first insulating layer 212. The second conductive layers 223G and 223T may be covered by the second insulating layer 214. The second conductive vias 234G and 234T may penetrate at least a portion of the second insulating layer 214, and contact the second conductive layers 223G and 223T on the upper surface of the first insulating layer 212 and the third conductive layers 225G, 225R, 225T on the upper surface of the second insulating layer 214.

The third insulating layer 216 may be disposed on the second insulating layer 214. The third conductive layers 225G, 225R, and 225T may be covered by the third insulating layer 216. Third conductive vias 236G and 236T may penetrate at least a portion of the third insulating layer 216 and contact the third conductive layers 225G, 225R, and 225T on the upper surface of the second insulating layer 214 and the fourth conductive layers 227G and 227T on the upper surface of the third insulating layer 216.

Figure 7:
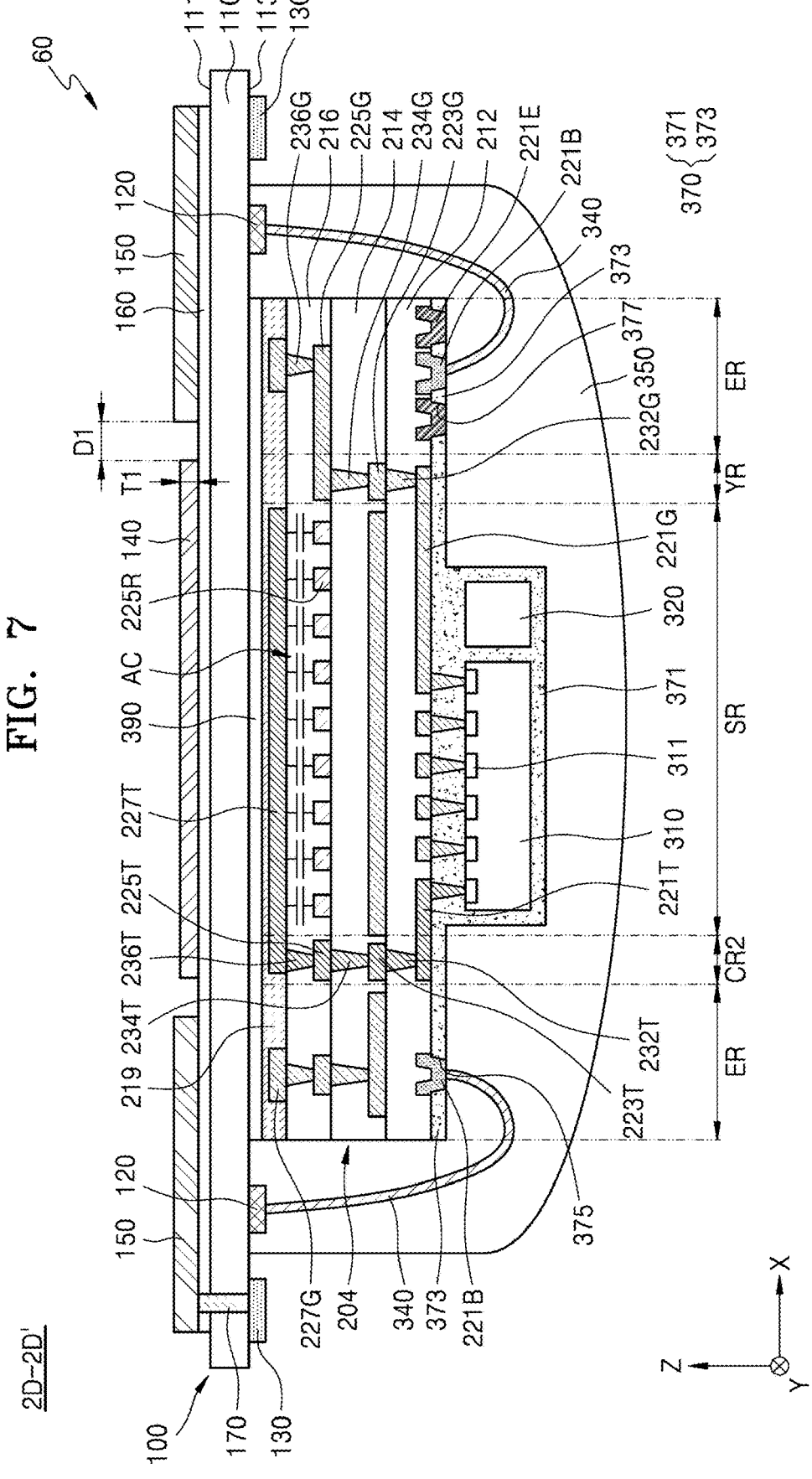
FIG. 7 is a cross-sectional view illustrating a fingerprint sensor package according to example embodiments of the inventive concepts.

FIG. 7 is a cross-sectional view illustrating a fingerprint sensor package 60 according to example embodiments of the inventive concepts.

Except for the second substrate 204, the fingerprint sensor package 60 shown in FIG. 7 may be substantially the same as or similar to the fingerprint sensor package 10 described with reference to FIGS. 2A to 2E. Hereinafter, the fingerprint sensor package 60 of FIG. 7 will be described with a focus on differences from the fingerprint sensor package 10 described with reference to FIGS. 2A to 2E.

Referring to FIG. 7, the fingerprint sensor package 60 includes a first substrate 100, a second substrate 204, a controller chip 310, a passive element 320, a conductive wire 340, a molding layer 350, and an inner molding layer 370. The fingerprint sensor package 60 may have a Fan-Out Wafer Level Package (FO-WLP) structure.

In the second substrate 204 a base layer may be omitted. The second substrate 204 may include first to third insulating layers 212, 214, and 216 sequentially stacked and an interconnect structure. The interconnect structure may include first conductive layers 221B, 221E, 221G, and 221T, second conductive layers 223G and 223T, third conductive layers 225G, 225R, and 225T, and fourth conductive layers 227G and 227T. Also, the interconnect structure may include first conductive vias 232G and 232T, second conductive vias 234G and 234T, and third conductive vias 236G and 236T having a tapered structure in which the horizontal width is narrowed toward the lower surface of the second substrate 204 in contact with the controller chip 310. In some embodiments, the interconnect structure may be formed by a dual damascene process.

The inner molding layer 370 may include a step portion formed by partially removing a flat mold material layer. The inner molding layer 370 may include a first molding part 371 protecting the controller chip 310 and the passive element 320, and a second molding part 373 extending laterally from an edge of the first molding part 371. The second molding part 373 may extend along the lower surface of the first insulating layer 212 from the edge of the first molding part 371 to the edge of the lower surface of the second substrate 204.

The second bonding pad 221B may be exposed through the second molding part 373. For example, the second bonding pad 221B may be disposed in the first opening 375 formed in the second molding part 373. The first segment of the second bonding pad 221B may extend on the upper surface of the second molding part 373 in contact with the first insulating layer 212, the second segment of the second bonding pad 221B may extend along the inner wall of the second molding part 373 defining the first opening 375 formed in the second molding part 373, and the third segment of the second bonding pad 221B may extend at the same level as the bottom surface of the second molding part 373. The conductive wire 340 may be connected to the third segment of the second bonding pad 221B.

The test pad 221E may be exposed through the second molding part 373. For example, the test pad 221E may be disposed in the second opening 377 formed in the second molding part 373. The first segment of the test pad 221E may extend on the upper surface of the second molding part 373 in contact with the first insulating layer 212, the second segment of the test pad 221E may extend along an inner wall of the second molding part 373 defining a second opening 377 formed in the second molding part 373, and the third segment of the test pad 221E may extend at the same level as the bottom surface of the second molding part 373.

Figure 8:
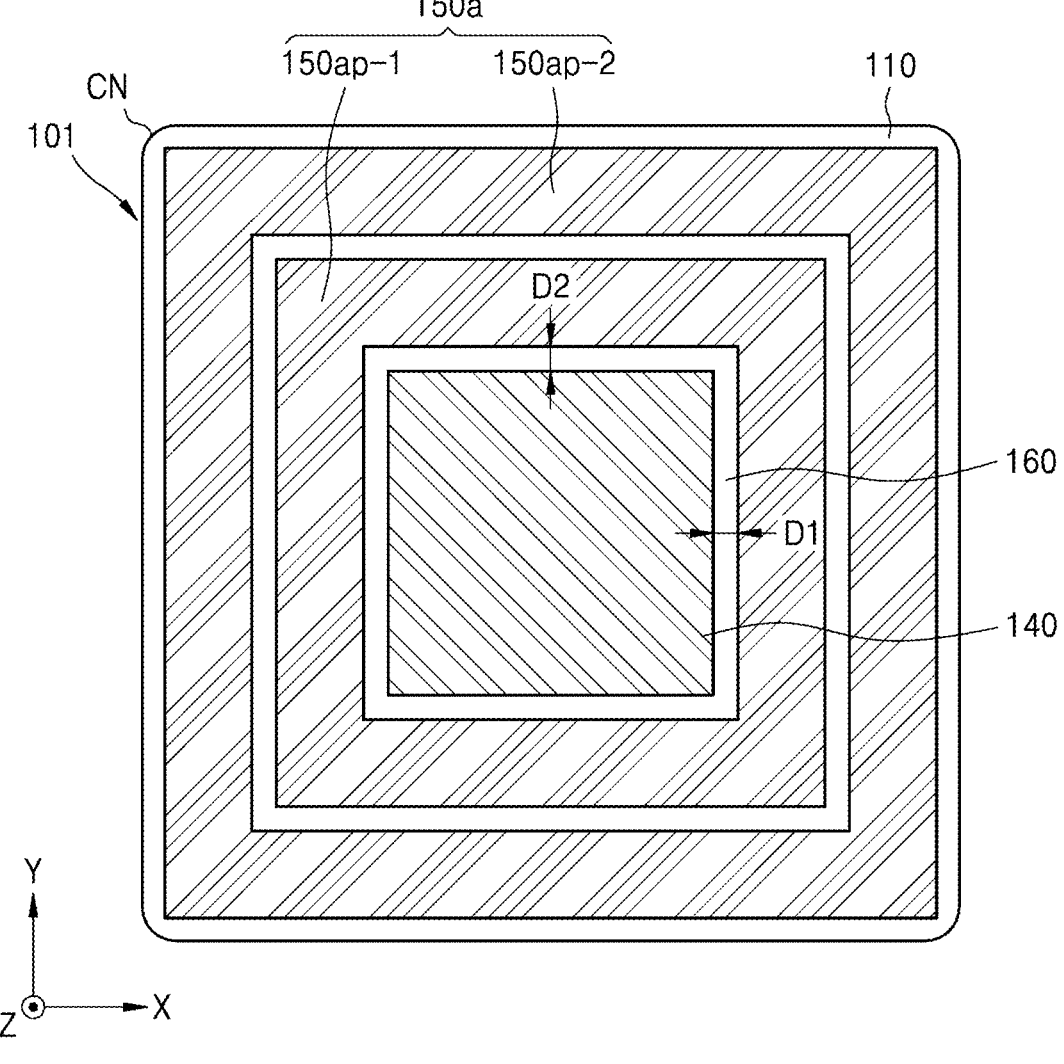
FIG. 8 is a plan view illustrating a first substrate of a fingerprint sensor package according to example embodiments of the inventive concepts.

FIG. 8 is a plan view illustrating a first substrate 101 of a fingerprint sensor package according to example embodiments of the inventive concepts.

Referring to FIG. 8, the first substrate 101 may include a coating layer 140 and a ground bezel 150a disposed on the first surface of the core insulating layer 110.

The ground bezel 150a may include a plurality of closed line patterns 150ap-1 and 150ap-2 spaced apart from each other. Each of the plurality of line patterns 150ap-1 and 150ap-2 may extend along the circumference of the side surface of the coating layer 140 and surround the coating layer 140 in the plan view. In some embodiments, the number of closed line patterns constituting the plurality of closed line patterns 150ap-1 and 150ap-2 is not limited to the illustrated two, but may be three or more.

A distance from the edge of the coating layer 140 to the ground bezel 150a may be spaced apart by a first distance D1 in the first direction (X direction), and may be spaced apart by a second distance D2 in the second direction (Y direction). In some embodiments, the first distance D1 and the second distance D2 may be substantially the same.

Figure 9:
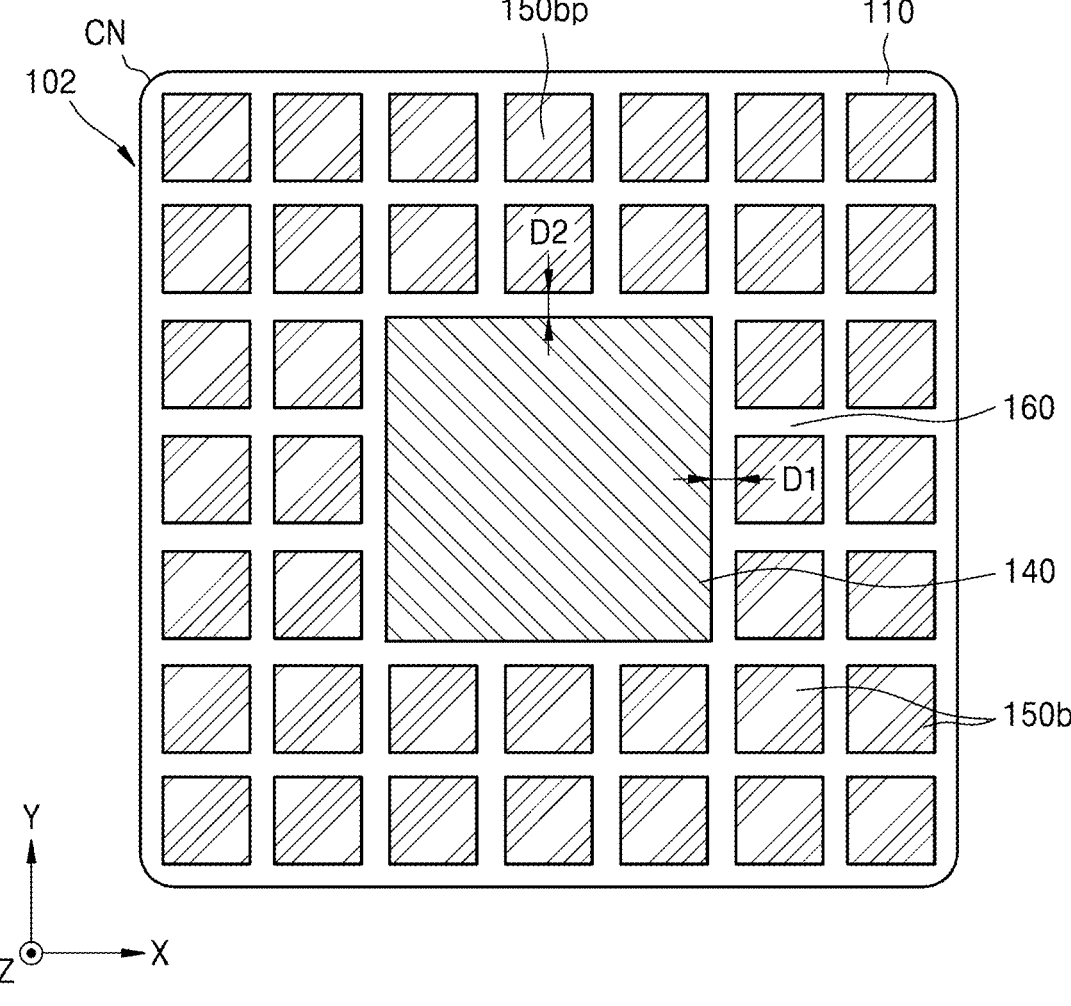
FIG. 9 is a plan view illustrating a first substrate of a fingerprint sensor package according to example embodiments of the inventive concepts.

FIG. 9 is a plan view illustrating a first substrate 102 of a fingerprint sensor package according to example embodiments of the inventive concepts.

Referring to FIG. 9, the first substrate 102 may include a coating layer 140 and a ground bezel 150b disposed on the first surface of the core insulating layer 110.

The ground bezel 150b may include a plurality of sub-patterns 150bp spaced apart from each other. A plurality of sub-patterns 150bp may be arranged along the side surface of the coating layer 140. Each of the plurality of sub-patterns 150bp may have a rectangular shape in a plan view. For example, the planar shape of the plurality of sub-patterns 150bp may be a rectangular shape, a square shape, and/or a rhombus shape. However, the example embodiments are not limited thereto, and in some embodiments, the planar shape of the plurality of sub-patterns 150bp may be a circle or a polygon such as a pentagon.

A distance from the edge of the coating layer 140 to the ground bezel 150b may be spaced apart by a first distance D1 in the first direction (X direction), and may be spaced apart by a second distance D2 in the second direction (Y direction). In some embodiments, the first distance D1 and the second distance D2 may be substantially the same.

FIGS. 10A to 10G are diagrams sequentially illustrating a method of manufacturing the smart card 1 according to example embodiments of the inventive concepts.

Figure 10A:
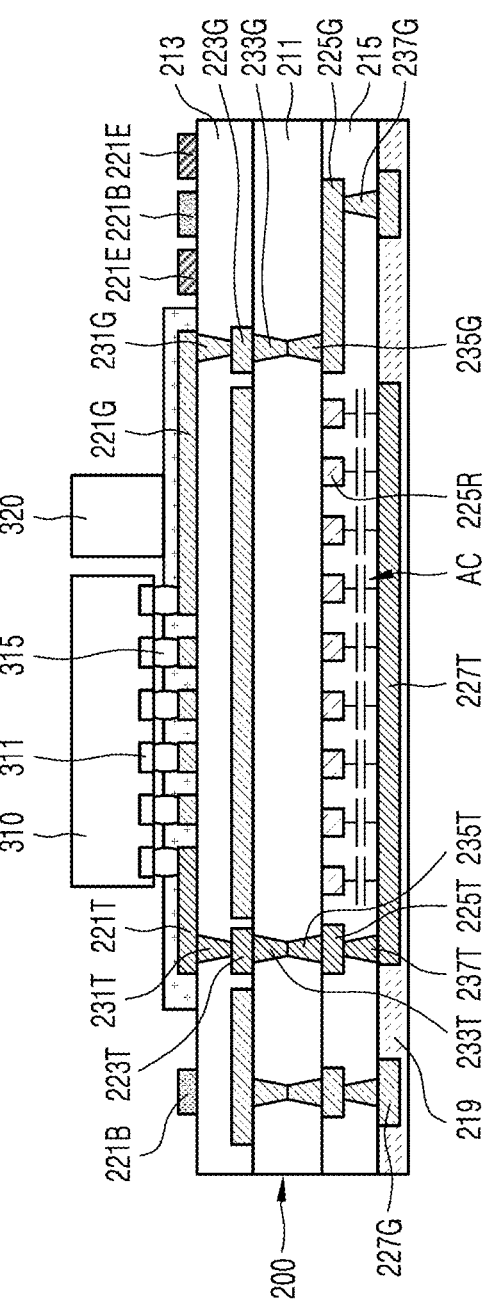
FIGS. 10A to 10G are diagrams sequentially illustrating a method of manufacturing a smart card according to example embodiments of the inventive concepts.

Referring to FIG. 10A, the second substrate 200 is prepared, and the controller chip 310 and the passive element 320 are mounted on the second substrate 200. The controller chip 310 may be mounted on the second substrate 200 by a flip chip method.

Figure 10B:
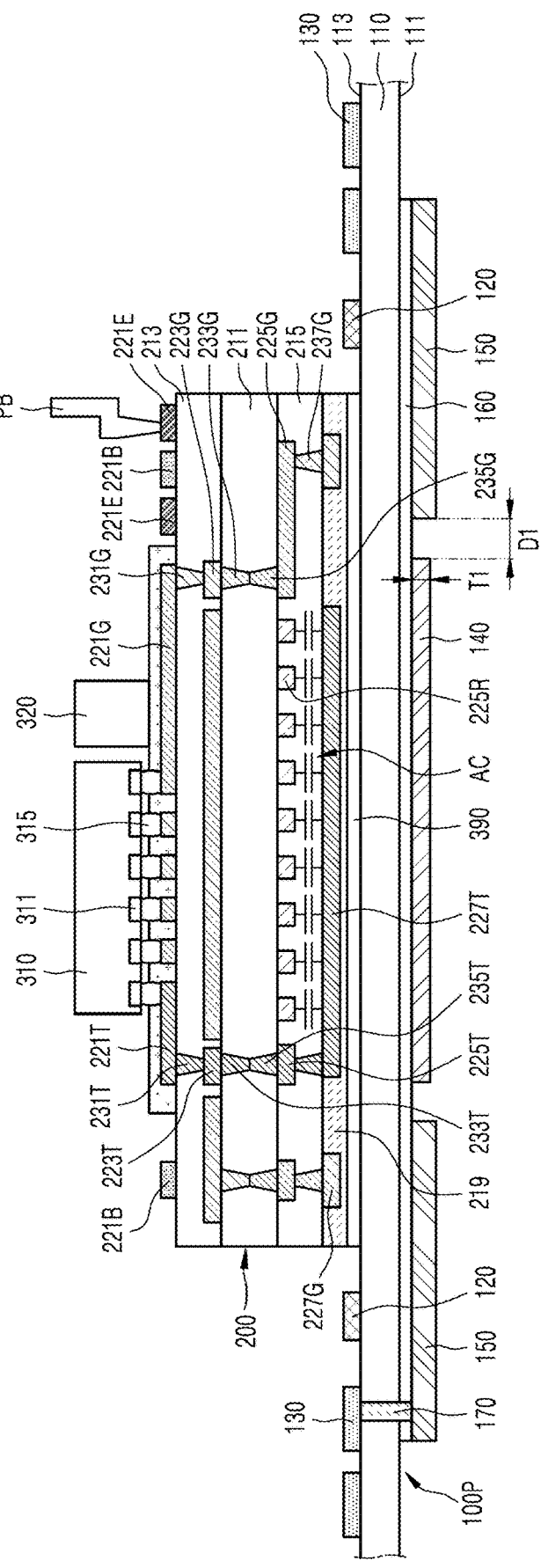

Referring to FIG. 10B, a first panel substrate 100P on which the second substrate 200 will be mounted is prepared. Most of the components constituting the first panel substrate 100P and materials constituting the components are substantially the same as or similar to those of the first substrate 100 of the fingerprint sensor package 10 described with reference to FIGS. 2A to 2E. However, the first panel substrate 100P may have a larger plan area than the first substrate 100 so that the plurality of second substrates 200 may be mounted thereon. The first panel substrate 100P may be mounted on a winding reel facility, and reeling and releasing of the first panel substrate 100P may be controlled by the winding reel facility.

After preparing the first panel substrate 100P, the second substrate 200 is mounted on the mounting region of the second surface 113 of the core insulating layer 110. The second substrate 200 may be fixed on the first panel substrate 100P by the substrate adhesive layer 390.

After the second substrate 200 is mounted on the first panel substrate 100P, the probe PB is brought into contact with the test pad 221E of the second substrate 200 to perform a test process. The external test device may apply an electrical test signal to the test pad 221E of the second substrate 200 through the probe PB, and receive a response signal output in response to the applied test signal through the probe PB. For example, the test signal applied to the test pad 221E may be transmitted to the controller chip 310 via the conductive connection pattern 229 and the second bonding pad 221B, or may be transmitted to the controller chip 310 through another electrical connection path of the second substrate 200 that does not pass through the conductive connection pattern 229 and the second bonding pad 221B. Through the test process, electrical performance of the second substrate 200, the controller chip 310, and the like may be tested.

Figure 10C:
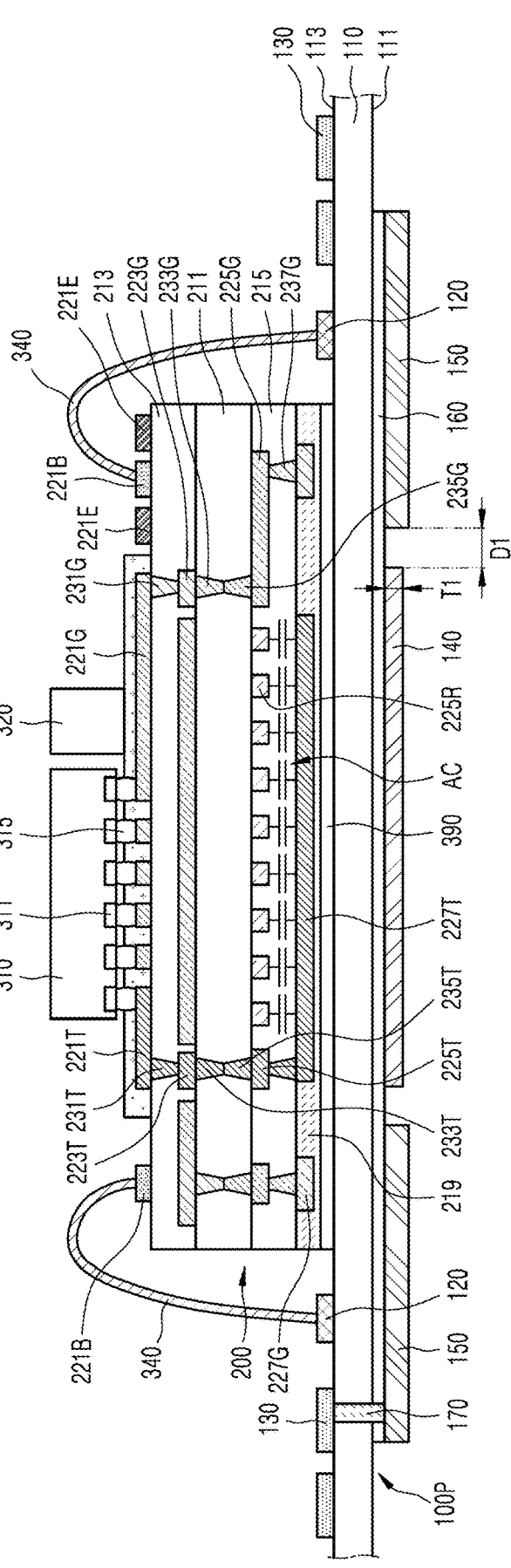

Referring to FIG. 10C, after the test process is performed, a conductive wire 340 for electrically connecting the first panel substrate 100P and the second substrate 200 is formed. The conductive wire 340 may extend between the first bonding pad 120 of the first panel substrate 100P and the second bonding pad 221B of the second substrate 200. The conductive wire 340 may be formed through a wire bonding process.

Figure 10D:
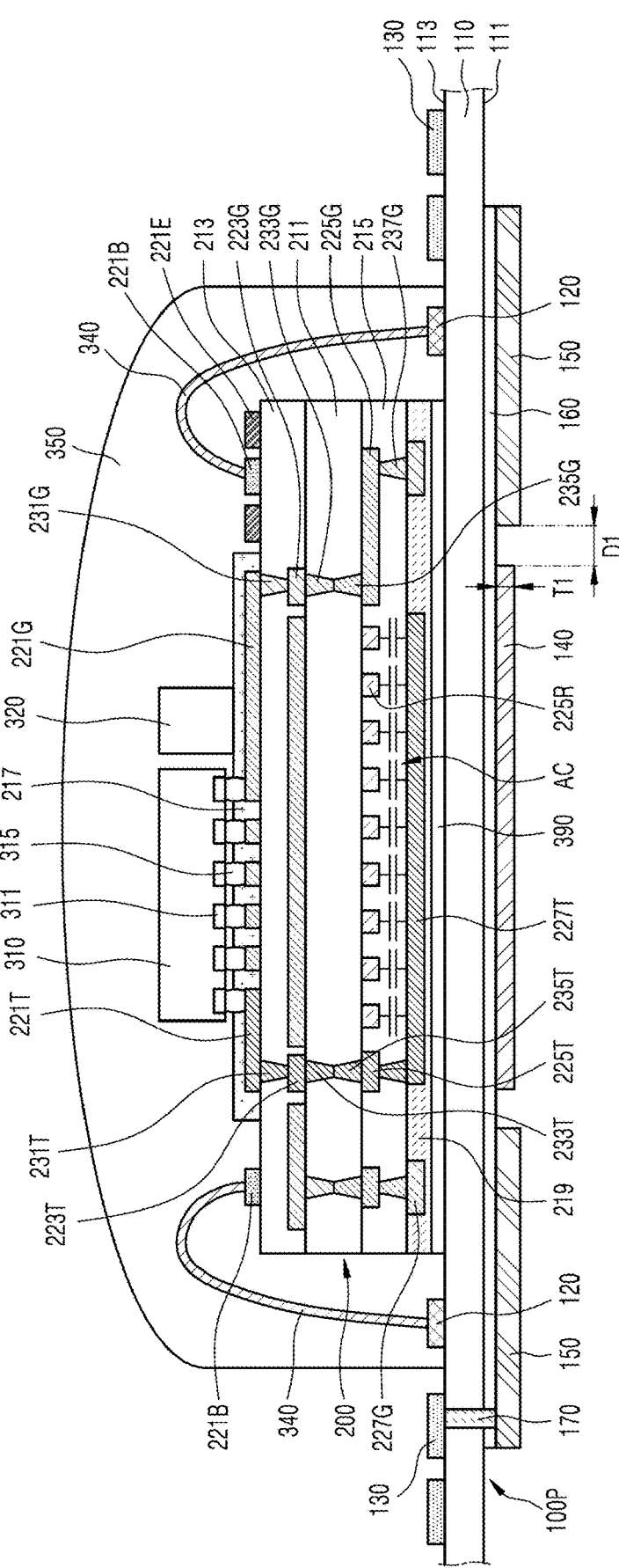

Referring to FIG. 10D, a molding layer 350 is formed on the second surface 113 of the core insulating layer 110. The molding layer 350 may cover the second substrate 200, the controller chip 310, the passive element 320, and the conductive wire 340. In addition, the molding layer 350 may cover the first bonding pad 120 of the first panel substrate 100P, but may not cover the external connection pad 130. For example, the molding layer 350 may extend laterally along the second surface 113 of the core insulating layer 110 from the side surface of the second substrate 200 to the boundary between the first bonding pad 120 and the external connection terminal.

Figure 10E:
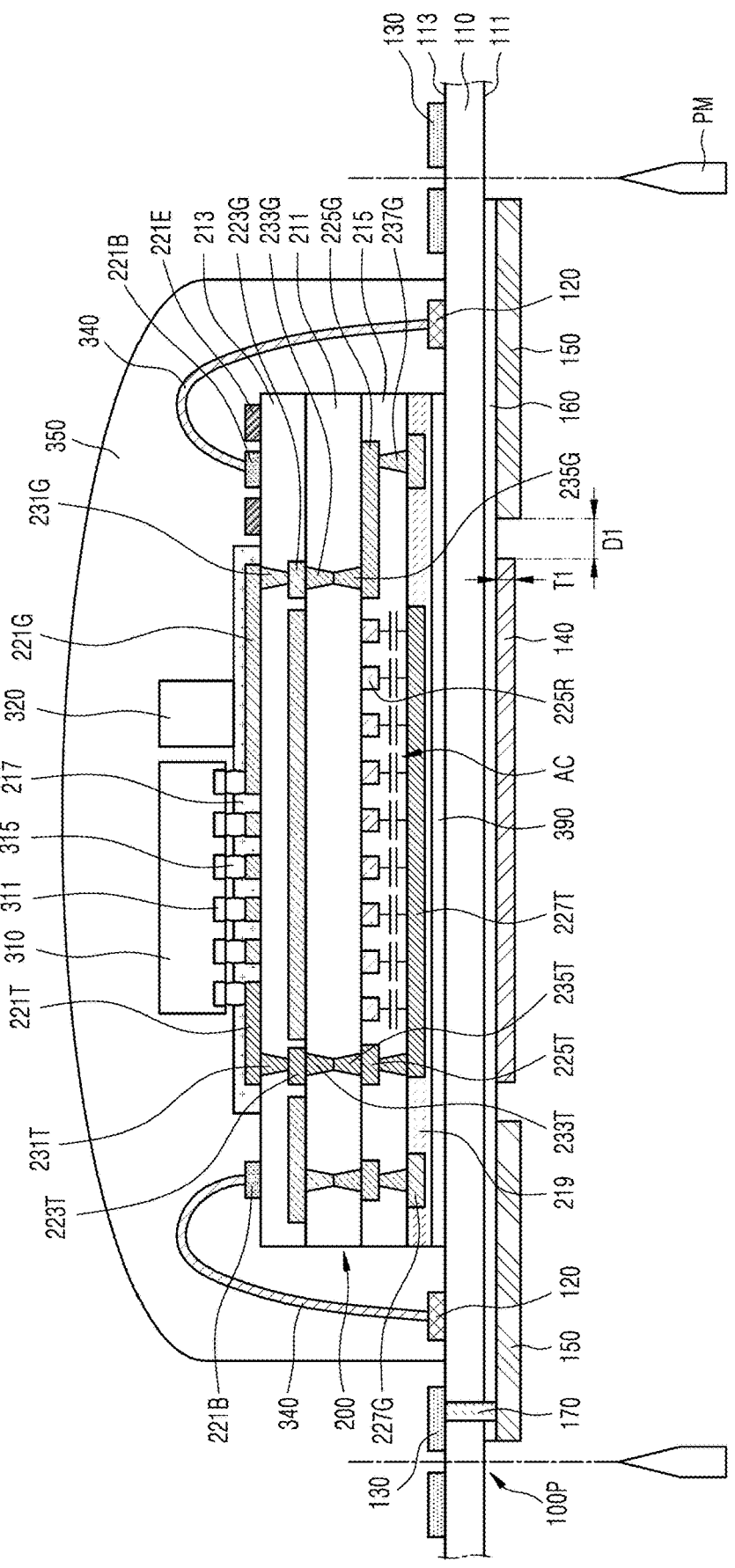

Referring to FIG. 10E, the first panel substrate 100P may be cut using the punching facility PM. The punching facility PM may cut the first panel substrate 100P to form the fingerprint sensor package 10 described with reference to FIGS. 2A to 2E. As the first panel substrate 100P is cut, a plurality of first substrates (refer to 100 of FIG. 2D) may be formed from the first panel substrate 100P. To prevent and/or mitigate cracks that may occur in the process of cutting the first panel substrate 100P using the punching facility PM, the punching facility PM may cut the first panel substrate 100P so that the corners of the first substrate 100 have a rounded shape.

Figure 10F:
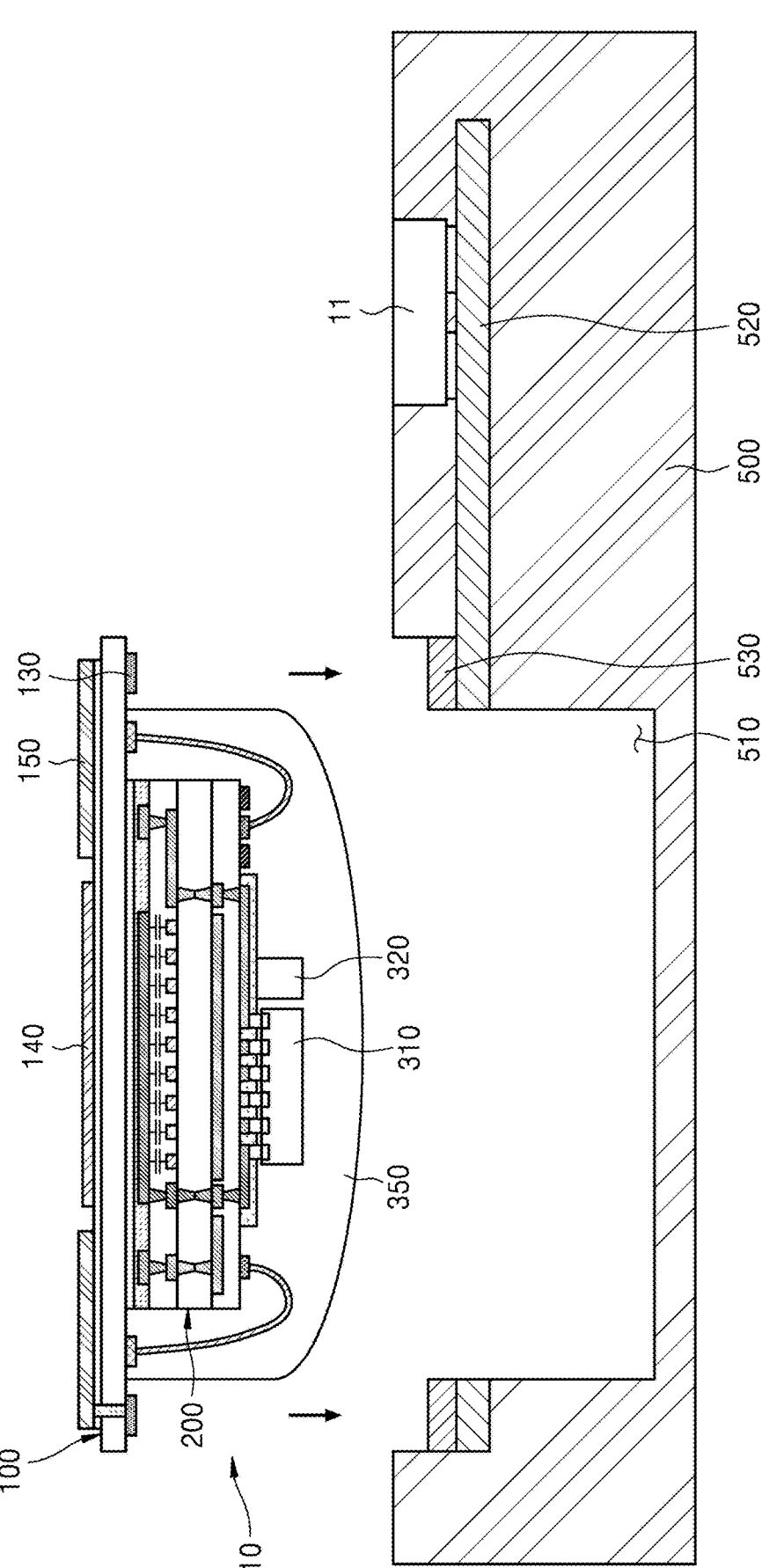

Referring to FIG. 10F, a card main body 500 including a card board 520, a connection pad 530, and a security chip 11 is prepared. The card main body 500 may include a groove region 510 for mounting the fingerprint sensor package 10. The card board 520 and the security chip 11 for storing financial information may be disposed on the card main body 500. For example, the card board 520 may be an FPCB.

The security chip 11 may be mounted on the card board 520. The security chip 11 may be disposed in the card main body 500 such that one surface of the security chip 11 is exposed to the outside. In addition, a connection pad 530 for electrical connection between the fingerprint sensor package 10 and other components in the card main body 500 may be disposed on the card board 520. The connection pad 530 may include a conductive material. The card main body 500 may include a groove region 510 for mounting the fingerprint sensor package 10.

Figure 10G:
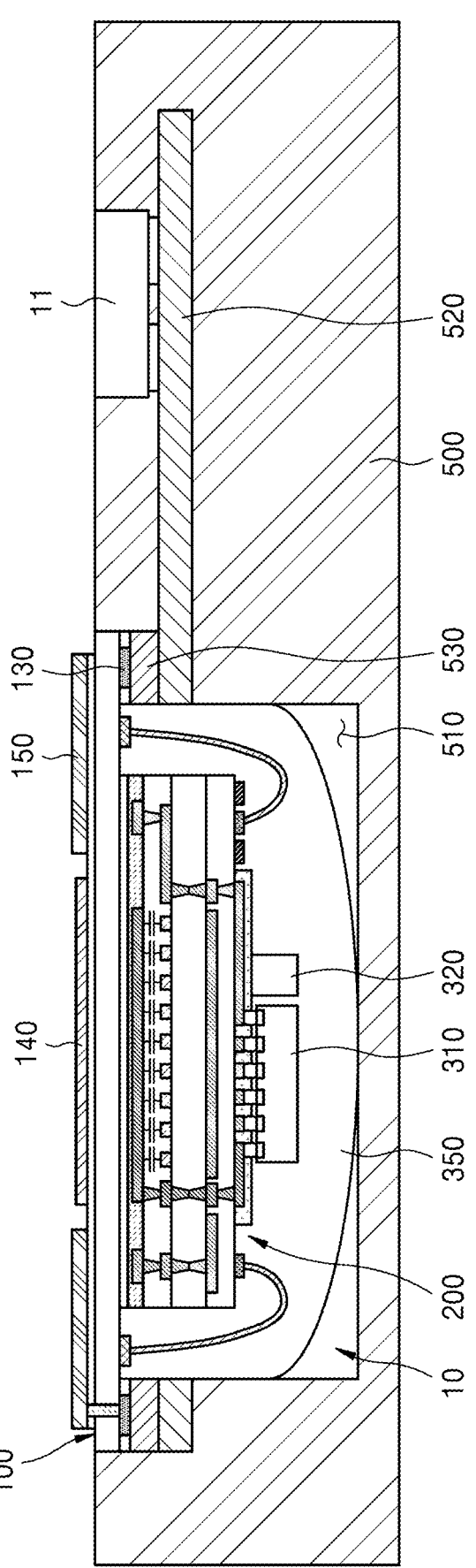

Referring to FIG. 10G, the fingerprint sensor package 10 is mounted on the card main body 500. A part of the fingerprint sensor package 10 may be accommodated in the groove region 510 of the card main body 500. The molding layer 350 of the fingerprint sensor package 10 may be accommodated in the groove region 510, and the external connection pad 130 of the first substrate 100 may be bonded to the connection pad 530 of the card board 520. The external connection pad 130 of the first board 100 may be physically and/or electrically connected to the connection pad 530 of the card board 520. In some embodiments, the groove region 510 is not completely filled by the molding layer 350 of the fingerprint sensor package 10, and a flow space may be formed between the molding layer 350 of the fingerprint sensor package 10 and the card main body 500. The flow space may provide a space in which the fingerprint sensor package 10 may flexibly respond according to the degree of bending of the smart card 1. In some embodiments, the flow space may be filled by applying an adhesive. In some embodiments, the adhesive and the molding layer 350 may have different tensile and/or compression characteristics, and, e.g., the adhesive may response more flexibly to bending.

Referring again to FIG. 1, the smart card 1 may include a fingerprint sensor package 10, a security chip 11, a display unit 12, and a power button 13. When a user brings a fingerprint into contact with the fingerprint sensor package 10 of the smart card 1, the touched fingerprint may be recognized. When the recognized fingerprint matches the registered fingerprint, the security chip 11 may grant payment authorization to the user of the smart card 1.

Figure 11:
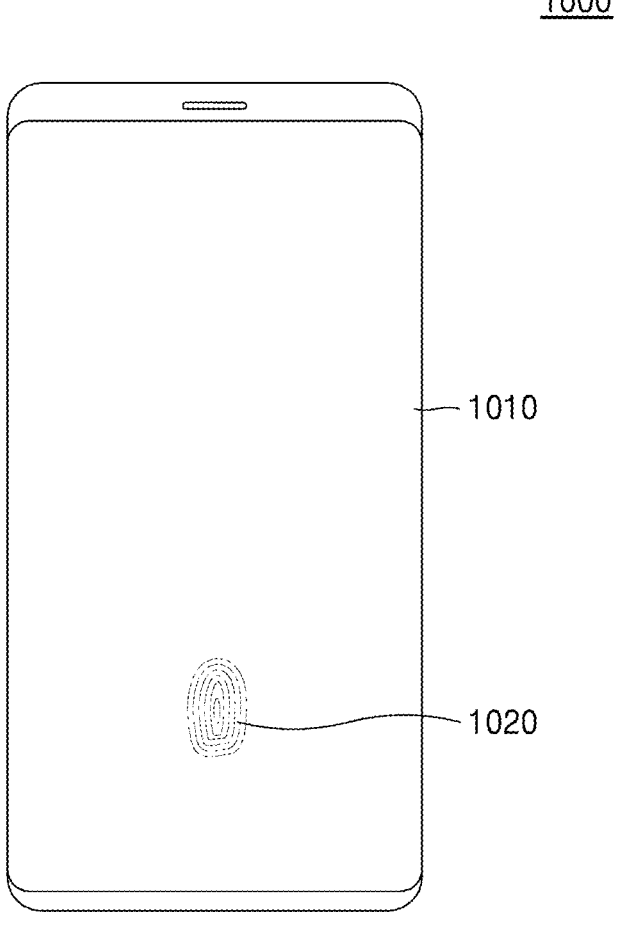
FIG. 11 is a plan view illustrating a mobile device including a fingerprint sensor package according to example embodiments of the inventive concepts.

FIG. 11 is a plan view illustrating a mobile device 1000 including a fingerprint sensor package according to example embodiments of the inventive concepts.

Referring to FIG. 11, the mobile device 1000 may include a touch screen type display 1010 and a fingerprint sensor package 1020. The mobile device 1000 may further include a camera, a speaker, a microphone, a temperature sensor, a motion sensor, and/or the like. The mobile device 1000 may be, e.g., a smart phone, although the examples embodiments are not limited thereto. For example, the mobile device 1000 may be a wearable device such as a notebook computer, a tablet computer, a smart watch, and/or the like, on which the fingerprint sensor package 1020 may be mounted. In the mobile device 1000, the fingerprint sensor package 1020 may be disposed on the display 1010. The fingerprint sensor package 1020 may correspond to any one selected from the fingerprint sensor packages 10, 20, 30, and 40 described above with reference to FIGS. 2A to 9.

While the inventive concepts have been particularly shown and described with reference to embodiments thereof, it will be understood that various changes in form and details may be made therein without departing from the spirit and scope of the following claims.

What is claimed is:

1. A fingerprint sensor package comprising:
a first substrate including first bonding pads and at least one external connection pad;
a second substrate attached to the first substrate, the second substrate including a plurality of first sensing patterns spaced apart from each other in a first direction and extending in a second direction intersecting the first direction, a plurality of second sensing patterns spaced apart from each other in the second direction and extending in the first direction, second bonding pads, and test pads;
conductive wires electrically connecting the first bonding pads and the second bonding pads;
a controller chip connected to the second substrate; and
a molding layer covering the controller chip, the first bonding pads, the second bonding pads, the test pads, and the conductive wires,
wherein at least one of the test pads is disposed between the second bonding pads and the controller chip.

2. The fingerprint sensor package of claim 1, wherein the second substrate comprises:
a sensing region including the plurality of first sensing patterns and the plurality of second sensing patterns; and
a peripheral region surrounding the sensing region in a plan view, the peripheral region including the test pads.

3. The fingerprint sensor package of claim 1, wherein the second substrate comprises:
a sensing region including the plurality of first sensing patterns and the plurality of second sensing patterns; and
a peripheral region surrounding the sensing region in a plan view, the peripheral region including at least one of the test pads.

4. The fingerprint sensor package of claim 3, wherein at least a portion of each of the second bonding pads is in the sensing region.

5. The fingerprint sensor package of claim 1, wherein
the second bonding pads are parallel to a first edge of the second substrate,
the test pads are parallel to the first edge of the second substrate, and
wherein the test pads comprise outer test pads between the second bonding pads and the first edge of the second substrate and inner test pads between the second bonding pads and the controller chip in a plan view.

6. The fingerprint sensor package of claim 1, wherein
the test pads include a first plurality of test pads that are parallel and adjacent to a first edge of the second substrate, and a second plurality of test pads that are parallel and adjacent to a second edge of the second substrate.

7. The fingerprint sensor package of claim 1, wherein
a horizontal width of each of the test pads has a range between about 200 μm and about 300 μm, and
the horizontal width of each of the test pads is greater than a horizontal width of each of the second bonding pads.

8. The fingerprint sensor package of claim 1, wherein
the first substrate further comprises a core insulating layer comprising a first surface and a second surface opposite to each other,
the first bonding pads, the at least one external connection pad, and the second substrate are on the second surface of the core insulating layer, the at least one external connection pad is between an edge of the second surface of the core insulating layer and the first bonding pads, and
the molding layer extends laterally along the second surface of the core insulating layer from a side surface of the second substrate to a boundary between the first bonding pads and the at least one external connection pad.

9. The fingerprint sensor package of claim 8, wherein the second substrate further comprises:
a sensing region including the plurality of first sensing patterns and the plurality of second sensing patterns; and
a peripheral region surrounding the sensing region in a plan view,
wherein the first substrate further comprises:
a coating layer on the first surface of the core insulating layer and overlapping the sensing region of the second substrate in a third direction perpendicular to the first direction and the second direction;
a ground bezel on the first surface of the core insulating layer and surrounding the coating layer in the plan view; and
an adhesive layer between the ground bezel and the core insulating layer and between the coating layer and the core insulating layer.

10. The fingerprint sensor package of claim 1, wherein at least one of the test pads is electrically connected to at least one of the second bonding pads through a conductive connection pattern.

11. The fingerprint sensor package of claim 1, further comprising:
an inner molding layer between the molding layer and the controller chip,
wherein the inner molding layer is spaced apart from the test pads.

12. The fingerprint sensor package of claim 1, further comprising:
an inner molding layer provided between the molding layer and the controller chip,
wherein the inner molding layer comprises first openings exposing the second bonding pads and second openings exposing the test pads.

13. The fingerprint sensor package of claim 1, further comprising:
a substrate adhesive layer between an upper surface of the second substrate and the first substrate,
wherein the controller chip is on a lower surface of the second substrate.

14. The fingerprint sensor package of claim 1, wherein the plurality of first sensing patterns are spaced apart from the plurality of second sensing patterns in a third direction perpendicular to the first direction and the second direction.

15. The fingerprint sensor package of claim 1, wherein the plurality of first sensing patterns are disposed on the plurality of second sensing patterns or disposed below the plurality of second sensing patterns.

16. A fingerprint sensor package comprising:
a first substrate including a first bonding pad;
a second substrate disposed on the first substrate, and including a plurality of first sensing patterns, a plurality of second sensing patterns, a second bonding pad, and a test pad;

a controller chip disposed on the second substrate;

a wire connected to the first bonding pad and the second bonding pad; and a molding layer covering the controller chip, wherein the plurality of second sensing patterns are disposed on the plurality of first sensing patterns and are spaced apart from the plurality of first sensing patterns, the plurality of first sensing patterns are spaced apart from each other in a first direction, and extend in a second direction that is different from the first direction, the plurality of second sensing patterns are spaced apart from each other in the second direction, and extend in the first direction, and the test pad is disposed between the second bonding pad and the controller chip.

17. The fingerprint sensor package of claim 16, wherein the plurality of first sensing patterns include a first pattern, and the plurality of second sensing patterns include a second pattern, and the first pattern and the second pattern define a first capacitor, the first pattern being a first electrode of the first capacitor, the second pattern being a second electrode of the first capacitor.

18. The fingerprint sensor package of claim 17, further comprising:

a first sensing pad connected to the first pattern; and a second sensing pad connected to the second pattern, a distance between the second sensing pad and the first substrate being greater than a distance between the first sensing pad and the first substrate.

19. A fingerprint sensor package comprising:

a first substrate including a first bonding pad;

a second substrate disposed on the first substrate, and including a plurality of first sensing patterns, a plurality of second sensing patterns, a second bonding pad, and a test pad;

a controller chip disposed on the second substrate; and a wire connected to the first bonding pad and the second bonding pad, wherein the plurality of second sensing patterns are disposed on the plurality of first sensing patterns and are spaced apart from the plurality of first sensing patterns, the plurality of first sensing patterns are spaced apart from each other in a first direction, and extend in a second direction that is different from the first direction, the plurality of second sensing patterns are spaced apart from each other in the second direction, and extend in the first direction, the plurality of first sensing patterns include a first pattern, and the plurality of second sensing patterns include a second pattern, the first pattern and the second pattern define a first capacitor, the first pattern being a first electrode of the first capacitor, the second pattern being a second electrode of the first capacitor, and the test pad is disposed between the second bonding pad and the controller chip.

20. The fingerprint sensor package of claim 19, wherein the first capacitor constitutes a fingerprint sensor.

* * * * *